(12) United States Patent
Hwang et al.

(10) Patent No.: US 11,999,147 B2
(45) Date of Patent: Jun. 4, 2024

(54) APPARATUS FOR ATTACHING DISPLAY PANEL AND METHOD FOR PROVIDING DISPLAY DEVICE USING THE SAME

(71) Applicant: Samsung Display Co., LTD., Yongin-si (KR)

(72) Inventors: Dae Hyun Hwang, Seoul (KR); Do Hyung Ryu, Yongin-si (KR); Hyun Sang Park, Gunpo-si (KR); Wu Hyeon Jung, Seoul (KR)

(73) Assignee: SAMSUNG DISPLAY CO., LTD., Gyeonggi-Do (KP)

( * ) Notice: Subject to any disclaimer, the term of this patent is extended or adjusted under 35 U.S.C. 154(b) by 19 days.

(21) Appl. No.: 17/315,504

(22) Filed: May 10, 2021

(65) Prior Publication Data

US 2022/0072842 A1   Mar. 10, 2022

(30) Foreign Application Priority Data

Sep. 7, 2020  (KR) .......................... 10-2020-0113678

(51) Int. Cl.
*B32B 37/10* (2006.01)
*B32B 3/04* (2006.01)

(52) U.S. Cl.
CPC ................ *B32B 37/10* (2013.01); *B32B 3/04* (2013.01); *B32B 2457/20* (2013.01)

(58) Field of Classification Search
None
See application file for complete search history.

(56) References Cited

U.S. PATENT DOCUMENTS

| | | | |
|---|---|---|---|
| 2011/0229223 A1* | 9/2011 | Sasaki ................ | G03G 15/2064 399/328 |
| 2019/0332043 A1* | 10/2019 | Nakabo .............. | G03G 15/2032 |
| 2020/0203672 A1* | 6/2020 | Kuon .................... | G06F 1/1652 |

FOREIGN PATENT DOCUMENTS

| | | |
|---|---|---|
| KR | 10-1005859 B1 | 1/2011 |
| KR | 1020200058722 A | 5/2020 |
| KR | 1020200078243 A | 7/2020 |

* cited by examiner

*Primary Examiner* — Michael N Orlando
*Assistant Examiner* — Abhishek A Patwardhan
(74) *Attorney, Agent, or Firm* — CANTOR COLBURN LLP

(57) ABSTRACT

An apparatus for attaching a display panel includes a panel mount which receives a panel bottom cover facing corner portions of the display panel which are extended bent from a front surface of the display panel, and a pressing module which provides a pressing force to the panel bottom cover which is received in the panel mount and faces the corner portions of the display panel. The pressing module includes a pressing pad which applies the pressing force to the panel bottom cover at the corner portions of the display panel to attach the panel bottom cover to the display panel at the corner portions thereof.

20 Claims, 33 Drawing Sheets

131: 1311, 1312, 1313, 1314
133: 1331, 1332, 1333, 1334

APPARATUS FOR ATTACHING DISPLAY PANEL AND METHOD FOR PROVIDING DISPLAY DEVICE USING THE SAME

This application claims priority to Korean Patent Application No. 10-2020-0113678 filed on Sep. 7, 2020, and all the benefits accruing therefrom under 35 U.S.C. § 119, the content of which in its entirety is herein incorporated by reference.

BACKGROUND

1. Field

The disclosure relates to an apparatus with which a display panel is attached to another object, and a method for providing a display device using the same.

2. Description of the Related Art

As the information-oriented society evolves, various display devices are being developed. For example, display devices are being employed by a variety of electronic devices such as smart phones, digital cameras, laptop computers, navigation devices and smart televisions.

A display device may be a flat display panel such as a liquid-crystal display panel, a field emission display panel or a light-emitting display panel. A light-emitting display panel may be an organic light-emitting display panel including organic light-emitting diodes ("LEDs"), a micro light-emitting diode display panel including micro LEDs, and an inorganic light-emitting display panel using inorganic light-emitting elements including an inorganic semiconductor. A light-emitting display panel has advantages of wide viewing angle, excellent contrast ratio and fast response speed. In addition, since the light-emitting display panel can be bent or curved, such a light-emitting display panel is increasingly used in more electronic devices.

SUMMARY

Embodiments of the disclosure provide an apparatus for attaching a display panel to another object such as a panel bottom cover. One or more embodiments reduce or effectively prevent failure during a process of attaching the panel bottom cover to a four-sided display panel at the corners thereof which may occur if the panel bottom cover is not properly attached to the display panel at the corners thereof.

Embodiments of the disclosure also provide a method for providing or fabricating an electronic display device for which failure during a process of attaching the panel bottom cover to a four-sided display panel at the corners thereof which may occur if the panel bottom cover is not properly attached to the display panel is reduced or effectively prevented.

An embodiment of an apparatus for attaching a display panel includes a panel mount which receives a panel bottom cover facing corner portions of the display panel which are extended bent from a front surface of the display panel, and a pressing module which provides a pressing force to the panel bottom cover which is received in the panel mount and faces the corner portions of the display panel. The pressing module includes a pressing pad which applies the pressing force to the panel bottom cover at the corner portions of the display panel to attach the panel bottom cover to the display panel at the corner portions thereof.

In an embodiment, the pressing module may include a pressing bracket to which the pressing pad is fixed, and a hardness of the pressing pad may be lower than a hardness of the pressing bracket.

In an embodiment, the pressing pad may include silicon, and the pressing bracket may include metal.

In an embodiment, the pressing pad may have a quadrangular frame shape.

In an embodiment, the pressing pad may include a first pressing pad and a second pressing pad extending in a first direction, and a third pressing pad and a fourth pressing pad extending in a second direction which intersects the first direction. The first pressing pad, the second pressing pad, the third pressing pad and the fourth pressing pad may be spaced apart from one another.

In an embodiment, a first end of the third pressing pad may be adjacent to a first end of the first pressing pad. A second end of the third pressing pad may be adjacent to a first end of the second pressing pad. In a first end of the fourth pressing pad may be adjacent to a second end of the first pressing pad. A second end of the fourth pressing pad may be adjacent to a second end of the second pressing pad.

In an embodiment, each of the first end and the second end of the first pressing pad, the first end and the second end of the second pressing pad, the first end and the second end of the third pressing pad, and the first end and the second end of the fourth pressing pad may have a triangular shape in a plan view.

In an embodiment, the pressing pad further may comprise a first corner pressing pad adjacent to the first end of the first pressing pad and the first end of the third pressing pad, a second corner pressing pad adjacent to the first end of the second pressing pad and the second end of the third pressing pad, a third corner pressing pad adjacent to the second end of the first pressing pad and the first end of the fourth pressing pad, and a fourth corner pressing pad adjacent to the second end of the second pressing pad and the second end of the fourth pressing pad.

In an embodiment, each of the first corner-pressing pad, the second corner-pressing pad, the third corner-pressing pad and the fourth corner-pressing pad may have a triangular shape in a plan view.

In an embodiment, the pressing module may include a pressing bracket including a first bracket and a second bracket which face each other with the pressing pad therebetween, a first air passage hole penetrating the first bracket, a second air passage hole penetrating the second bracket, and the first air passage hole and the second air passage hole aligned with each other.

In an embodiment, the apparatus may further include a fixing member which fixes the first bracket to the second bracket.

In an embodiment, the first bracket may define a first fixing hole through which the fixing member is fixed. The second bracket may define a second fixing hole into which the fixing member is inserted and the second fixing hole penetrates the second bracket.

In an embodiment, the pressing pad may include a fixing portion including a pressing support portion extending in a thickness direction of the pressing pad, and a pressing portion extending from an end of the pressing support portion.

In an embodiment, the first bracket may include a body, and a protrusion portion including a first protrusion portion protruding from opposing ends of the body in a thickness direction of the body, and a second protrusion portion which protrudes from the first protrusion portion in the thickness direction of the body.

In an embodiment, the first protrusion portion may include an extension portion including a first extension portion protruding from the edge of the surface of the body in a thickness direction of the first bracket, and a second extension portion protruding from an end of the first extension portion toward a center of the first bracket.

In an embodiment, the fixing portion of the pressing pad may be in a space defined by the body, the first extension portion and the second extension portion.

In an embodiment, the pressing support portion of the pressing pad may be between the second protrusion portion of the first bracket and a side surface of the second bracket.

In an embodiment, the pressing portion of the pressing pad may be on a lower surface of the second protrusion portion of the first bracket.

In an embodiment, the second bracket may include a supporter which supports a portion of a lower surface of the pressing portion.

In an embodiment, the pressing module and the pressing pad may be movable together in a direction toward the panel mount, and movement of the pressing module to the panel mount includes both contacting the pressing pad to the panel bottom cover at the corner portions of the display panel, and applying the pressing force to the panel bottom cover to attach the panel bottom cover to the display panel at the corner portions thereof.

In an embodiment, the display panel may include a front surface, a first side surface extending from a first side of the front surface, a second side surface extending from a second side of the front surface, and a first corner between the first side surface and the second side surface.

In an embodiment, the pressing portion of the pressing pad may include a first pressing portion corresponding to the first side surface and including a lower surface having a first curvature, a second pressing portion corresponding to the second side surface and including a lower surface having a second curvature, and a first corner-pressing portion corresponding to the first corner and having a flat lower surface.

An embodiment of a method for providing a display device includes providing a display panel of the display device on a panel mount, the display panel including a front surface, a first side surface extending bent from a first side of the front surface, a second side surface extending bent from a second side of the front surface, a third side surface extending bent from a third side of the front surface which faces the first side, a fourth side surface extending bent from a fourth side of the front surface which faces the second side, a first corner which connects the first side surface to the second side surface, a second corner which connects the second side surface to the third side surface, a third corner which connects the third side surface to the fourth side surface, and a fourth corner which connects the fourth side surface to the first side surface, providing a panel bottom cover of the display device on the panel mount and facing the display panel, and providing a pressing force to the panel bottom cover using a pressing pad at the first corner, the second corner, the third corner and the fourth corner of the display panel to respectively attach the panel bottom cover to the display panel at the first corner, the second corner, the third corner and the fourth corner thereof.

In an embodiment, the pressing module may include a pressing bracket including a first bracket, a second bracket in an empty space in a central area of a lower surface of the first bracket, and a pressing pad between the first bracket and the second bracket.

In an embodiment, the method may further include pressing the panel bottom cover at the front surface, the second side surface and the fourth side surface of the display panel using a first roller, and pressing the panel bottom cover at the front surface, the first side surface and the third side surface of the display panel using a second roller.

In an embodiment, the first roller and the second roller may have different lengths.

In an embodiment, the first side surface of the display panel may include a first curved surface extending from the first side of the front surface and having a curvature, and a first flat surface extending from the first curved surface. The second side surface of the display panel may include a second curved surface extending from the second side of the front surface and having a curvature, and a second flat surface extending from the second curved surface. The third side surface of the display panel may include a third curved surface extending from the third side of the front surface and having a curvature, and a third flat surface extending from the third curved surface. The fourth side surface of the display panel may include a fourth curved surface extending from the fourth side of the front surface and having a curvature, and a fourth flat surface extending from the fourth curved surface.

In an embodiment, the method may further include pressing the panel bottom cover at the front surface of the display panel using a roller, pressing the panel bottom cover at the first flat surface and the third flat surface of the display panel using a side-pressing module, and pressing the panel bottom cover at the second flat surface and the fourth flat surface of the display panel using the side-pressing module.

In an embodiment, the pressing the panel bottom cover at the first to fourth corners of the display panel using the pressing module may include pressing the panel bottom cover at the first curved surface, the second curved surface, the third curved surface and the fourth curved surface.

BRIEF DESCRIPTION OF THE DRAWINGS

These and/or other features of the invention will become apparent and more readily appreciated by describing in further detail embodiments thereof with reference to the accompanying drawings, in which.

DETAILED DESCRIPTION

Figure 1:
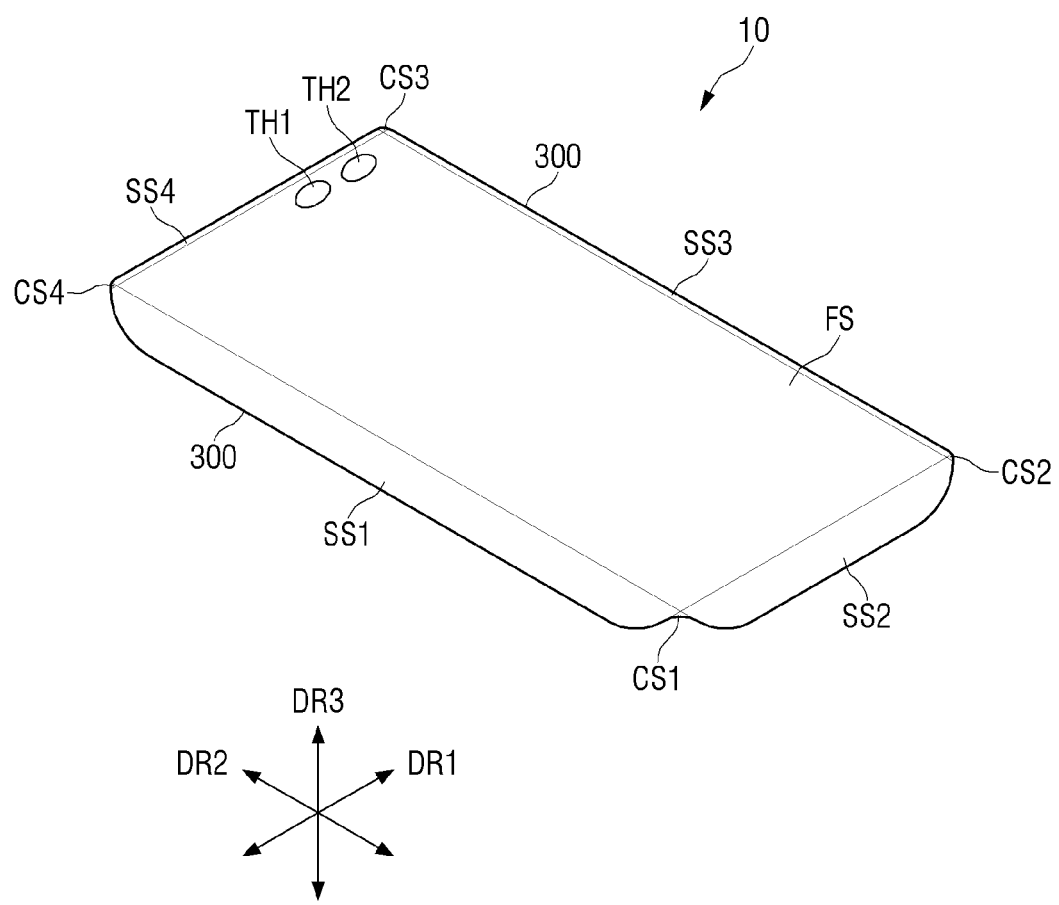
FIG. 1 is a perspective view of an embodiment of a display panel.

The invention will now be described more fully hereinafter with reference to the accompanying drawings, in which various embodiments of the invention are shown. The invention may, however, be embodied in different forms and should not be construed as limited to the embodiments set forth herein. Rather, these embodiments are provided so that this disclosure will be thorough and complete, and will filly convey the scope of the invention to those skilled in the art. The same reference numbers indicate the same components throughout the specification. In the attached drawing figures, the thickness of layers and regions is exaggerated for clarity.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

It will also be understood that when a layer is referred to as being related to another element such as being "on" another layer or substrate, it can be directly on the other layer or substrate, or intervening layers may also be present. In contrast, when an element is referred to as being related to another element such as being "directly on" another element, there are no intervening elements present.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." "At least one of A and B" means "A and/or B." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Embodiments are described herein with reference to cross-section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. A region illustrated or described as flat may, typically, have rough and/or nonlinear features, for example. Moreover, sharp angles that are illustrated may be rounded. Thus, the regions illustrated in the drawing figures are schematic in nature and their shapes are not intended to illustrate the precise shape of a region and are not intended to limit the scope of the claims.

A four-sided electronic display device is being developed, where images are displayed on side display surfaces of the electronic display device which are extended bent from four edges of a front display surface of the electronic display device. Such an electronic display device includes a corner between a first side display surface extended bent at a first-side edge of the front display surface and a second side display surface extended bent at a second-side edge of the front display surface. The corner may have a double curvature defined by the curvature of the first side display surface and the curvature of the second side display surface.

During a process of attaching a bottom cover of the electronic display device to the rear surface of a four-sided display panel thereof, in order to protect the rear surface of the four-sided display panel, the four-sided display panel and the bottom cover may not be properly assembled with each other due to the double curvature of the corners. As a result, the bottom cover may not be properly attached to the four-sided display panel at the corners.

Hereinafter, embodiments of the disclosure will be described in detail with reference to the accompanying drawings.

Figure 2:
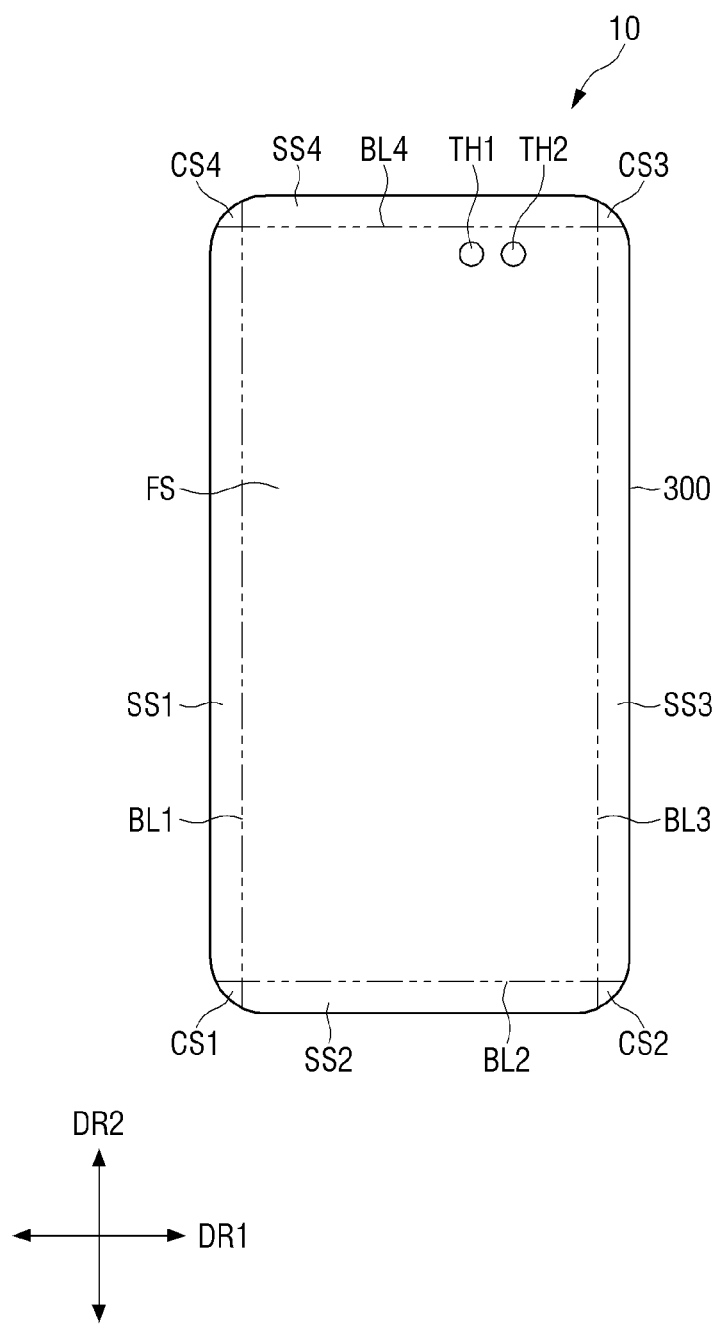
FIG. 2 is a top plan view showing an embodiment a display panel.

FIG. 1 is a perspective view of an embodiment of a display panel 300. FIG. 2 is a top plan view showing an embodiment of a display panel 300.

Referring to FIGS. 1 and 2, a display device 10 may be employed by portable electronic devices such as a mobile phone, a smart phone, a tablet personal computer ("PC"), a mobile communications terminal, an electronic notebook, an electronic book, a portable multimedia player ("PMP"), a navigation device or a ultra mobile PC ("UMPC"). Alternatively, the display device 10 may be used as a display unit of a television, a laptop computer, a display monitor, an electronic billboard or the Internet of Things ("TOT"). Alternatively, the display device 10 may be applied to wearable electronic devices such as a smart watch, a watch phone, a glasses-type display or a head-mounted display ("HMD") device. Alternatively, the display device 10 may be used as a center information display ("CID") disposed at the instrument cluster, the center fascia and/or the dashboard of a vehicle, as a room mirror display on the behalf of the side mirrors of a vehicle or as an entertainment display placed on the back of each of the front seats that is an entertainment system for passengers at the rear seats of a vehicle.

Figure 3:
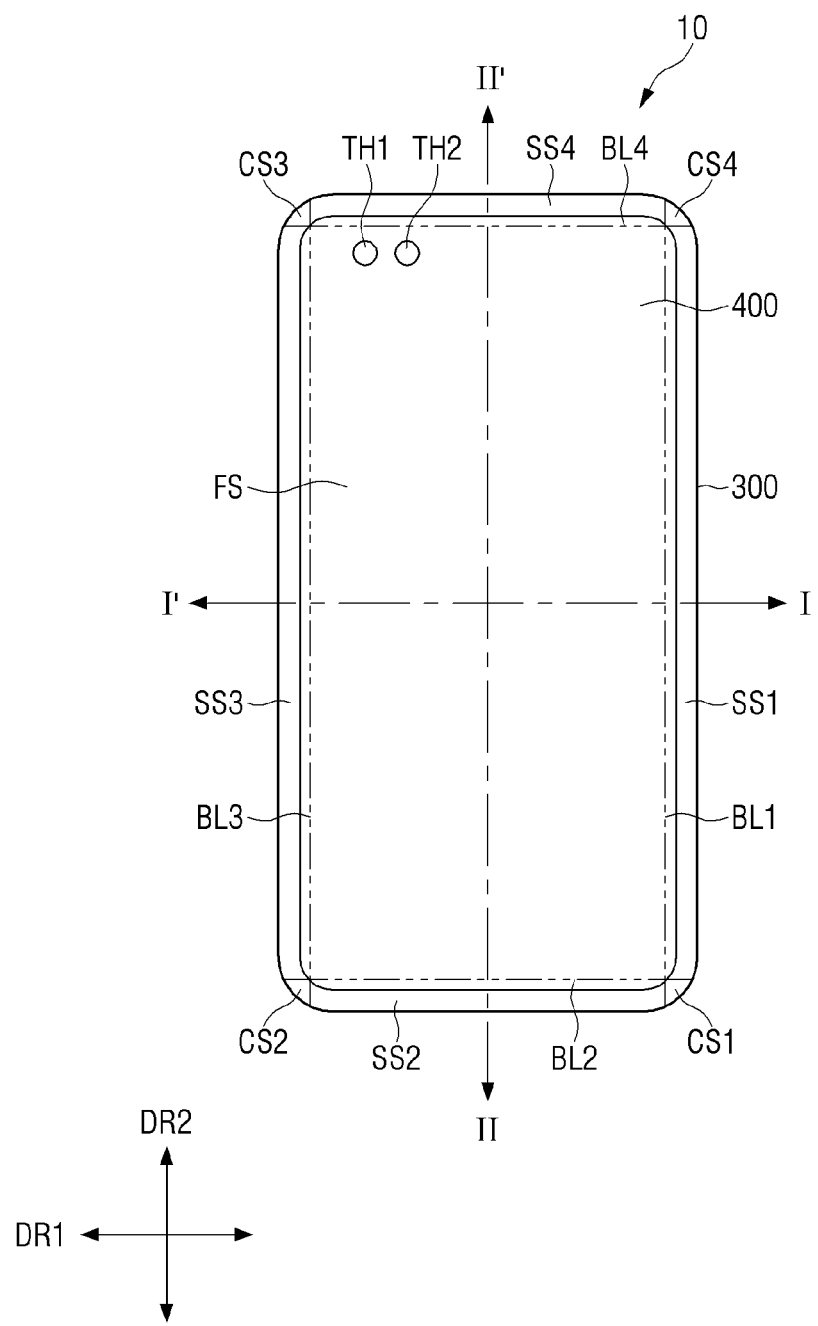
FIG. 3 is a bottom plan view showing an embodiment of a display panel.

The display device 10 includes a display panel 300 and a panel bottom cover 400 (see FIG. 3).

As used herein, a first direction DR1 may refer to the direction along which the shorter sides of the display panel 300 are extended, for example, the horizontal direction of the display panel 300. A second direction DR2 may refer to the direction along which the longer sides of the display panel 300 are extended, for example, the vertical direction of the display panel 300. A third direction DR3 may refer to a thickness direction of the display panel 300. Each of the above-described directions may also be applicable to the display device 10 and various components thereof.

The display panel 300 may be a light-emitting display panel including light-emitting elements. In an embodiment, for example, the display panel 300 may include an organic light-emitting display panel using a display element such as organic light-emitting diodes including an organic emissive layer, a micro light-emitting diode display panel using a display element such as micro LEDs, or an inorganic light-emitting display panel using a display element such as inorganic light-emitting elements including an inorganic semiconductor.

The display panel 300 may be a four-sided display panel including a front surface FS, a first side surface SS1, a second side surface SS2, a third side surface SS3, a fourth side surface SS4, a first corner CS1, a second corner CS2, a third corner CS3 and a fourth corner CS4. The front surface FS may be otherwise referred to as a front portion. The side surfaces SS1, SS2, SS3 and SS4 may be otherwise referred to as side portions including a first side portion, a second side portion, a third side portion and a fourth side portion of the display panel 300, respectively. Similarly, the corners CS1, CS2, CS3 and CS4 may be otherwise referred to as corner portions including a first corner portion, a second corner portion, a third corner portion and a fourth corner portion of the display panel 300, respectively. Each of aforementioned portions may define a portion of an outer surface of the display panel 300, and together may define the outer surface of the display panel 300 without being limited thereto. A side portion may extend bent from a respective side of the front surface FS, along a bending line. The bending line may correspond to the respective side of the front surface FS without being limited thereto.

The front surface FS may have, but is not limited to, a rectangular shape having shorter sides extended along the first direction DR1 and longer sides extended along the second direction DR2 in a plan view. The front surface FS may have other planar shapes such as polygonal shape, a circular shape or an oval shape in a plan view. Portions of the front surface FS at each of the corners where the short sides extended along the first direction DR1 respectively meet the longer sides extended along the second direction DR2 may be rounded with a curvature or may be a right angle. The front surface FS may be flat within a plane defined by the first direction DR1 and the second direction DR2 crossing each other or may include a curved surface.

The first side surface SS1 may extend from a first side of the front surface FS. The first side surface SS1 is bent from the front surface FS along a first bending line BL1 extended along the first side of the front surface FS, and may have a curvature. The angle between the front surface FS and the first side surface SS1 may be equal to or less than about 90 degrees. Referring to FIG. 2, the first side of the front surface FS may be the left side of the front surface FS.

The second side surface SS2 may extend from a second side of the front surface FS. The second side surface SS2 is bent from the front surface FS along a second bending line BL2 extended along the second side of the front surface FS, and may have a curvature. The curvature of the second side surface SS2 may be substantially equal to or different from the curvature of the first side surface SS1. The angle between the front surface FS and the second side surface SS2 may be equal to or less than about 90 degrees. Referring to FIG. 2, the second side of the front surface FS may be the right side of the front surface FS.

The third side surface SS3 may extend from a third side of the front surface FS. The third side surface SS3 is bent from the front surface FS along a third bending line BL3 extended along the third side of the front surface FS, and may have a curvature. The angle between the front surface FS and the third side surface SS3 may be equal to or less than about 90 degrees. Referring to FIG. 2, the third side of the front surface FS may be the lower side of the front surface FS.

The fourth side surface SS4 may extend from a fourth side of the front surface FS. The fourth side surface SS4 is bent from the front surface FS along a fourth bending line BL4 extended along the fourth side of the front surface FS, and may have a curvature. The curvature of the fourth side surface SS4 may be substantially equal to or different from the curvature of the third side surface SS3. The angle between the front surface FS and the fourth side surface SS4 may be equal to or less than about 90 degrees. Referring to FIG. 2, the fourth side of the front surface FS may be the upper side of the front surface FS.

The first corner CS1 may be located between the first side surface SS1 and the second side surface SS2 and connect the first side surface SS1 and the second side surface SS2 to each other. The first corner CS1 may be defined as a corner region of the display panel 300 which is bent along both the first bending line BL1 and the second bending line BL2. Accordingly, the first corner CS1 may have a double curvature defined by the curvature of the first side surface SS1 and the curvature of the second side surface SS2.

The second corner CS2 may be located between the second side surface SS2 and the third side surface SS3 and connect the second side surface SS2 and the third side surface SS3 to each other. The second corner CS2 may be defined as a corner region of the display panel 300 which is bent along both the second bending line BL2 and the third bending line BL3. Accordingly, the second corner CS2 may have a double curvature defined by the curvature of the second side surface SS2 and the curvature of the third side surface SS3.

The third corner CS3 may be located between the third side surface SS3 and the fourth side surface SS4 and connect the third side surface SS3 and the fourth side surface SS4 to each other. The third corner CS3 may be defined as a corner region of the display panel 300 which is bent along both the third bending line BL3 and the fourth bending line BL4. Accordingly, the third corner CS3 may have a double curvature defined by the curvature of the third side surface SS3 and the curvature of the fourth side surface SS4.

The fourth corner CS4 may be located between the first side surface SS1 and the fourth side surface SS4 and connect the first side surface SS1 and the fourth side surface SS4 to each other. The fourth corner CS4 may be defined as a corner region of the display panel 300 which bent along both the first bending line BL1 and the fourth bending line BL4. Accordingly, the fourth corner CS4 may have a double curvature defined by the curvature of the first side surface SS1 and the curvature of the fourth side surface SS4.

A first through hole TH1 and a second through hole TH2 may be located within a planar area the front surface FS. Each of the first through hole TH1 and the second through hole TH2 may be a hole penetrating the display panel 300. That is, the hole may extend through one or more layer of the display panel 300 and may be open to outside the display panel 300 along the third direction DR3. Although the first through hole TH1 and the second through hole TH2 have a circular shape in a plan view in the example shown in FIGS. 1 and 2, the planar shape of the first through hole TH1 and the second through hole TH2 is not limited thereto. The first through hole TH1 and the second through hole TH2 may have a polygonal, elliptical or irregular shape as a planar shape in a plan view.

As shown in FIGS. 1 and 2, the display panel 300 includes the front surface FS, the side surfaces SS1, SS2, SS3 and SS4, and the corners CS1, CS2, CS3 and CS4, and thus an image may be displayable at the side surfaces SS1, SS2, SS3 and SS4 and the corners CS1, CS2, CS3 and CS4 as well as at the front surface FS.

Figure 4:
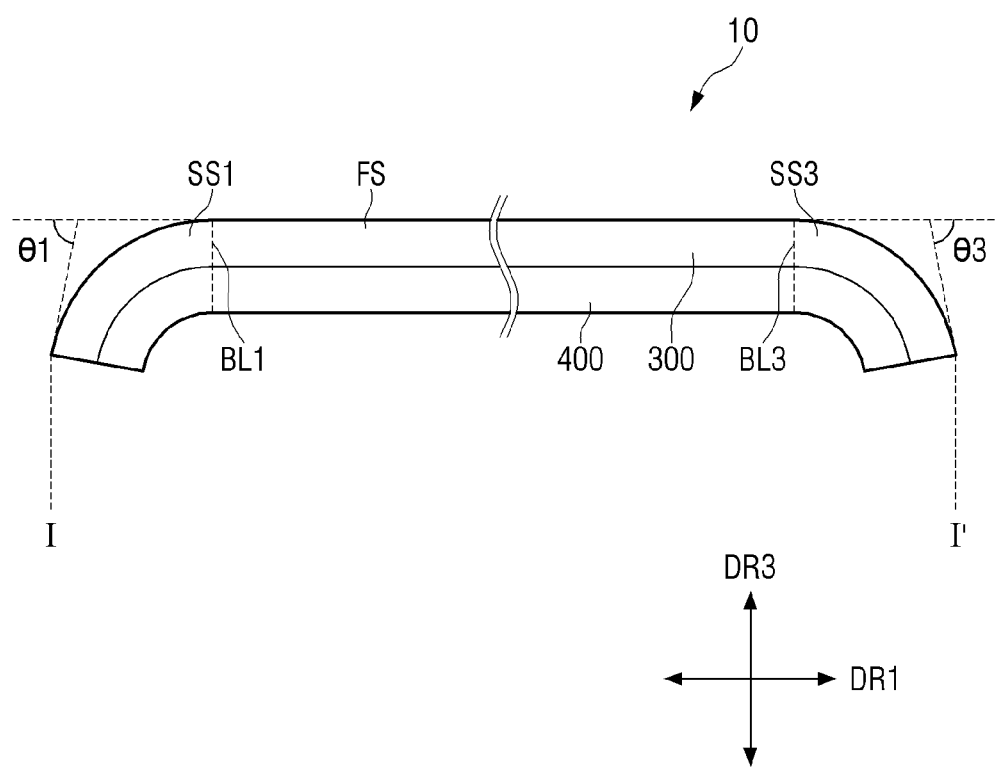
FIG. 4 is a cross-sectional view showing an embodiment of the display panel and the panel bottom cover taken along line I-I' of FIG. 3.
Figure 5:
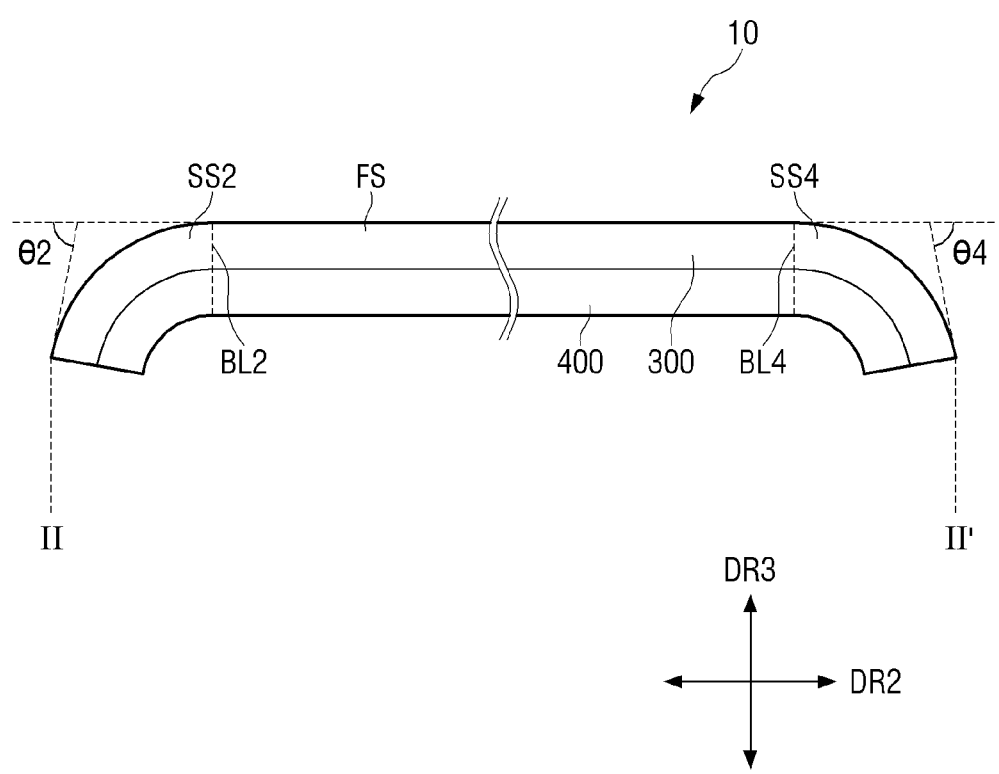
FIG. 5 is a cross-sectional view showing an embodiment of the display panel and the panel bottom cover taken along line II-II' of FIG. 3.

FIG. 3 is a bottom plan view showing an embodiment of a display panel 300 and a panel bottom cover 400. FIG. 4 is a cross-sectional view showing an embodiment of the display panel 300 and the panel bottom cover 400 taken along line I-I' of FIG. 3. FIG. 5 is a cross-sectional view showing an embodiment of the display panel 300 and the panel bottom cover 400 taken along line II-II' of FIG. 3.

Referring to FIGS. 3 to 5, in the display panel 300, a first angle θ1 between the front surface FS and the first side surface SS1, a second angle θ2 between the front surface FS and the second side surface SS2, a third angle θ3 between the front surface FS and the third side surface SS3 and a fourth angle θ4 between the front surface FS and the fourth side surface SS4 may be about 90 degrees or less. That is to say, each of the first side surface SS1, the second side surface SS2, the third side surface SS3 and the fourth side surface SS4 may be extended bent from the front surface FS at an angle of about 90 degrees or less.

The panel bottom cover 400 may be disposed under the display panel 300. Although an end of the panel bottom cover 400 coincides with an end of the display panel 300 in the example shown in FIGS. 4 and 5, an arrangement of the ends is not limited thereto. That is, end surfaces of the display panel 300 and the panel bottom cover 400 may be aligned with or coplanar with each other, without being limited thereto.

Referring to FIGS. 4 and 5, each of the display panel 300 and the panel bottom cover 400 has a length along the first direction DR1 and along the second direction DR2. The length may be a maximum dimension of a respective element along the respective direction. The lengths of the panel bottom cover 400 along the first direction DR1 and along the second direction DR2 may be smaller than the lengths of the display panel 300 along the first direction DR1 and along the second direction DR2, respectively. That is, the display panel 300 may extend further than the panel bottom cover 400 along a respective direction. Accordingly, an edge of the rear surface of the display panel 300 (e.g., an end surface) may not be covered by the panel bottom cover 400. That is, the end surface of the display panel 300 may be exposed outside of the panel bottom cover 400.

The display panel 300 may face the panel bottom cover 400 along the third direction DR3. The panel bottom cover 400 may include side surface portions respectively corresponding to the side surfaces SS1, SS2, SS3 and SS4 of the display panel 300 and corner portions respectively corresponding to the corners CS1, CS2, CS3 and CS4 of the display panel 300. The panel bottom cover 400 may also include a front portion which corresponds to the front surface FS of the display panel 300. Referring to FIGS. 4 and 5, an entirety of the side portions and the corner portions may be curved along a length thereof.

A rear surface of an element may be opposite to the front surface FS along the third direction DR3. The rear surface of an element may be furthest from the front surface FS thereof. The panel bottom cover 400 may be attached to the rear surface of the display panel 300 such as by an adhesive member. The adhesive member may be a pressure-sensitive adhesive ("PSA") (not shown). The panel bottom cover 400 may not overlap the first through hole TH1 and the second through hole TH2 of the display panel 300. That is, the panel bottom cover 400 may include an opening corresponding to a respective through hole of the display panel 300. Accordingly, the first through hole TH1 and the second through hole TH2 of the display panel 300 may be exposed to outside the panel bottom cover 400 at the opening without being covered by the panel bottom cover 400.

The panel bottom cover 400 may include at least one of a light-absorbing member for absorbing light incident from outside the display device 10, a buffer member for absorbing external impact to the display device 10, and a heat dissipating member for efficiently discharging heat from the display panel 300.

The light-absorbing member may be disposed on the rear surface of the display panel 300. The light-absorbing member blocks transmission of light so that visibility of elements disposed on the rear surface of the light-absorbing member, e.g., a circuit board connected to the second side surface SS2 of the display panel 300 from outside or above the display panel 300. The light-absorbing member may include a light-absorbing material such as a black pigment or a black dye.

The buffer member may be disposed on the rear surface of the light-absorbing member. The buffer member can absorb an external impact to reduce or effectively prevent the display panel 300 from being damaged. The buffer member may be made up of a single layer or multiple layers. For example, the buffer member may include or be formed of a polymer resin such as polyurethane, polycarbonate, polypropylene or polyethylene, or may include or be formed of a material having elasticity such as a rubber or a sponge having a foamed urethane-based material or a foamed an acrylic-based material.

The heat dissipating member may be disposed on the rear surface of the buffer member. That is, the display device 10 may include in order from the rear surface of the display panel 300, the light-absorbing member, the buffer member and the heat dissipating member. The heat-dissipating member may include a first heat dissipation layer including graphite or carbon nanotubes, and a second heat dissipation layer including or formed of a thin metal film such as copper, nickel, ferrite or silver, which can block electromagnetic waves and have high thermal conductivity.

Figure 6:
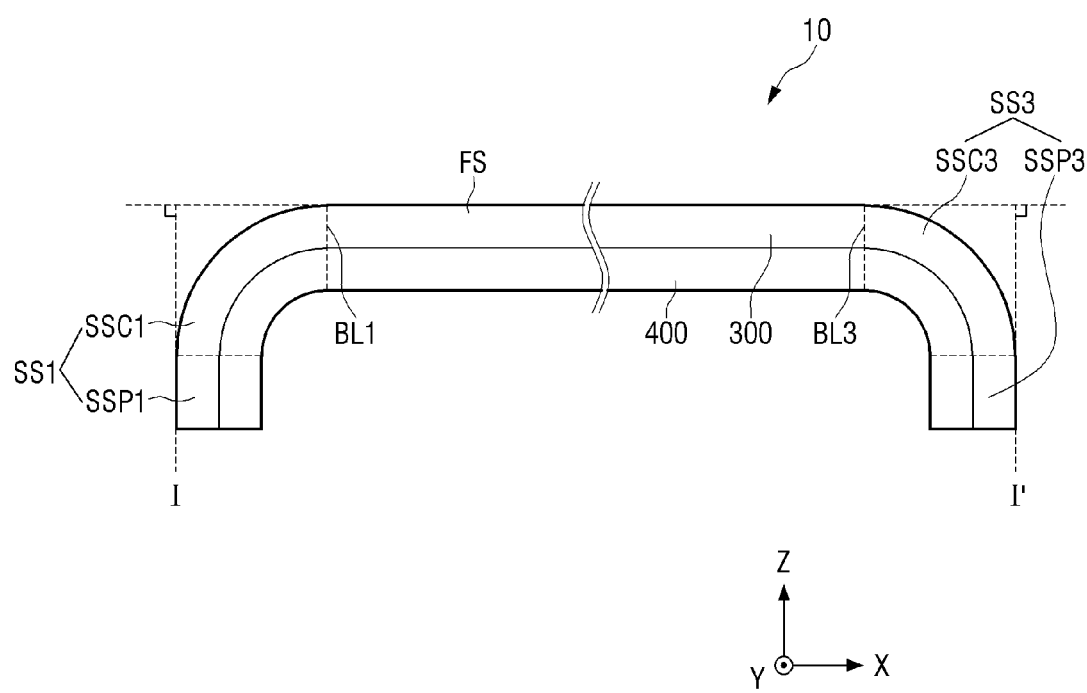
FIG. 6 is a cross-sectional view showing an embodiment of the display panel and the panel bottom cover taken along line I-I' of FIG. 3.
Figure 7:
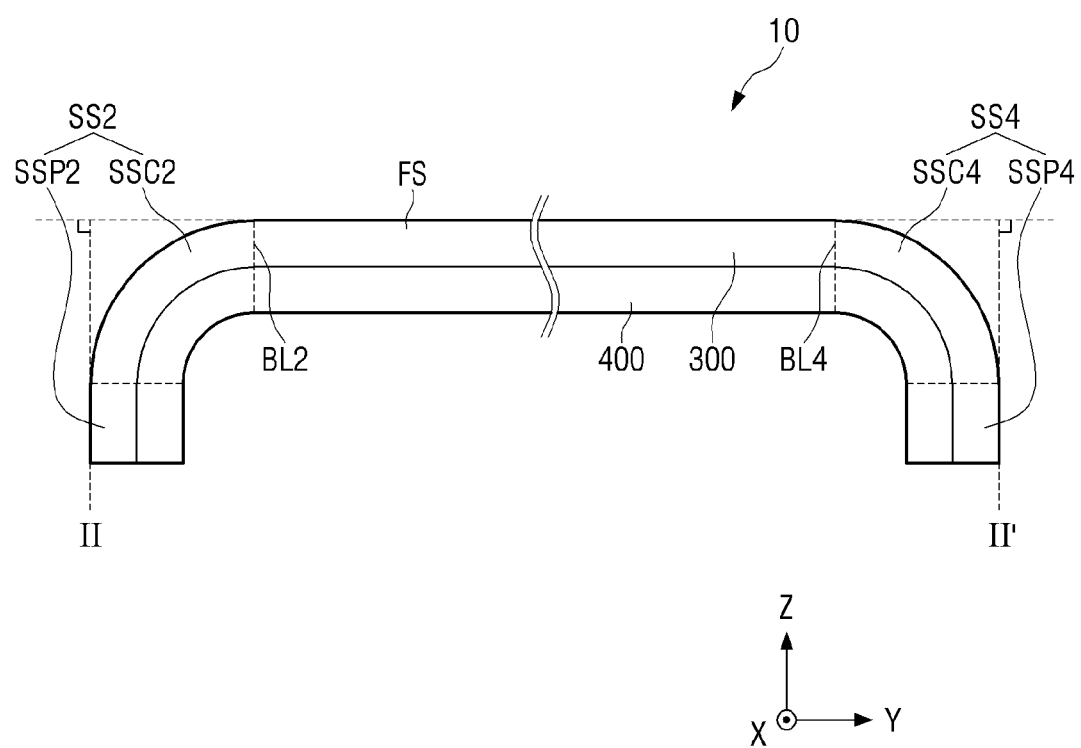
FIG. 7 is a cross-sectional view showing an embodiment of the display panel and the panel bottom cover taken along line II-II' of FIG. 3.

FIG. 6 is a cross-sectional view showing an embodiment of the display panel 300 and the panel bottom cover 400 taken along line I-I' of FIG. 3. FIG. 7 is a cross-sectional view showing an embodiment of the display panel 300 and the panel bottom cover 400 taken along line II-II' of FIG. 3.

The display panel 300 of FIGS. 6 and 7 is different from the display panel 300 of FIGS. 4 and 5 in that a first angle θ1 between the front surface FS and the first side surface SS1, a second angle θ2 between the front surface FS and the second side surface SS2, a third angle θ3 between the front surface FS and the third side surface SS3, and a fourth angle θ4 between the front surface FS and the fourth side surface SS4 are equal to about 90 degrees. Referring to FIGS. 6 and 7, less than an entirety of the side portions and the corner portions of the display panel 300 and the panel bottom cover 400 may be curved along a length thereof. The description will focus on the difference.

Referring to FIGS. 6 and 7, each of the first side surface SS1, the second side surface SS2, the third side surface SS3 and the fourth side surface SS4 may be extended bent from the front surface FS at the angle of about 90 degrees.

The first side surface SS1 may include a first curved surface SSC1 extending curved from a first side of the front surface FS, and a first flat surface SSP1 extending from an end of the first curved surface SSC1. The first curved surface SSC1 may have a first curvature, and the first flat surface SSP1 may be flat. As being flat, a flat surface may be parallel to the third direction DR3 and/or extended in a direction normal to the front surface FS (e.g., normal to the plane defined by the first direction DR1 and the second direction DR2 which cross each other.)

The second side surface SS2 may include a second curved surface SSC2 extending curved from a second side of the front surface FS, and a second flat surface SSP2 extending from an end of the second curved surface SSC2. The second curved surface SSC2 may have a second curvature, and the second flat surface SSP2 may be flat.

The third side surface SS3 may include a third curved surface SSC3 extending curved from a third side of the front surface FS, and a third flat surface SSP3 extending from an end of the third curved surface SSC3. The third curved surface SSC3 may have a third curvature, and the third flat surface SSP3 may be flat.

The fourth side surface SS4 may include a fourth curved surface SSC4 extending curved from a fourth side of the front surface FS, and a fourth flat surface SSP4 extending from an end of the fourth curved surface SSC4. The fourth curved surface SSC4 may have a fourth curvature, and the fourth flat surface SSP4 may be flat.

The curved surfaces may be otherwise referred to as a first curved side portion, a second curved side portion, a third curved side portion and a fourth curved side portion of the display panel 300, respectively. Similarly, the flat surfaces may be otherwise referred to as a first flat side portion, a second flat side portion, a third flat side portion and a fourth flat side portion of the display panel 300, respectively. Each of aforementioned portions may define a portion of an outer surface of the display panel 300, and together may define the outer surface of the display panel 300 without being limited thereto. The panel bottom cover 400 may include curved surfaces respectively corresponding to those of the display panel 300 and flat surfaces respectively corresponding to those of the display panel 300. The flat side portion of the display panel 300 and the panel bottom cover 400 defines an end surface of the respective element.

When each of the first side surface SS1, the second side surface SS2, the third side surface SS3 and the fourth side surface SS4 is extended bent from the front surface FS at the angle of about 90 degrees as shown in FIGS. 6 and 7, an image may be displayable at each of the side surfaces SS1, SS2, SS3 and SS4 of the display panel 300 and visible even from a viewpoint facing the side surfaces SS1, SS2, SS3 and SS4 of the display panel 300.

Figure 8:
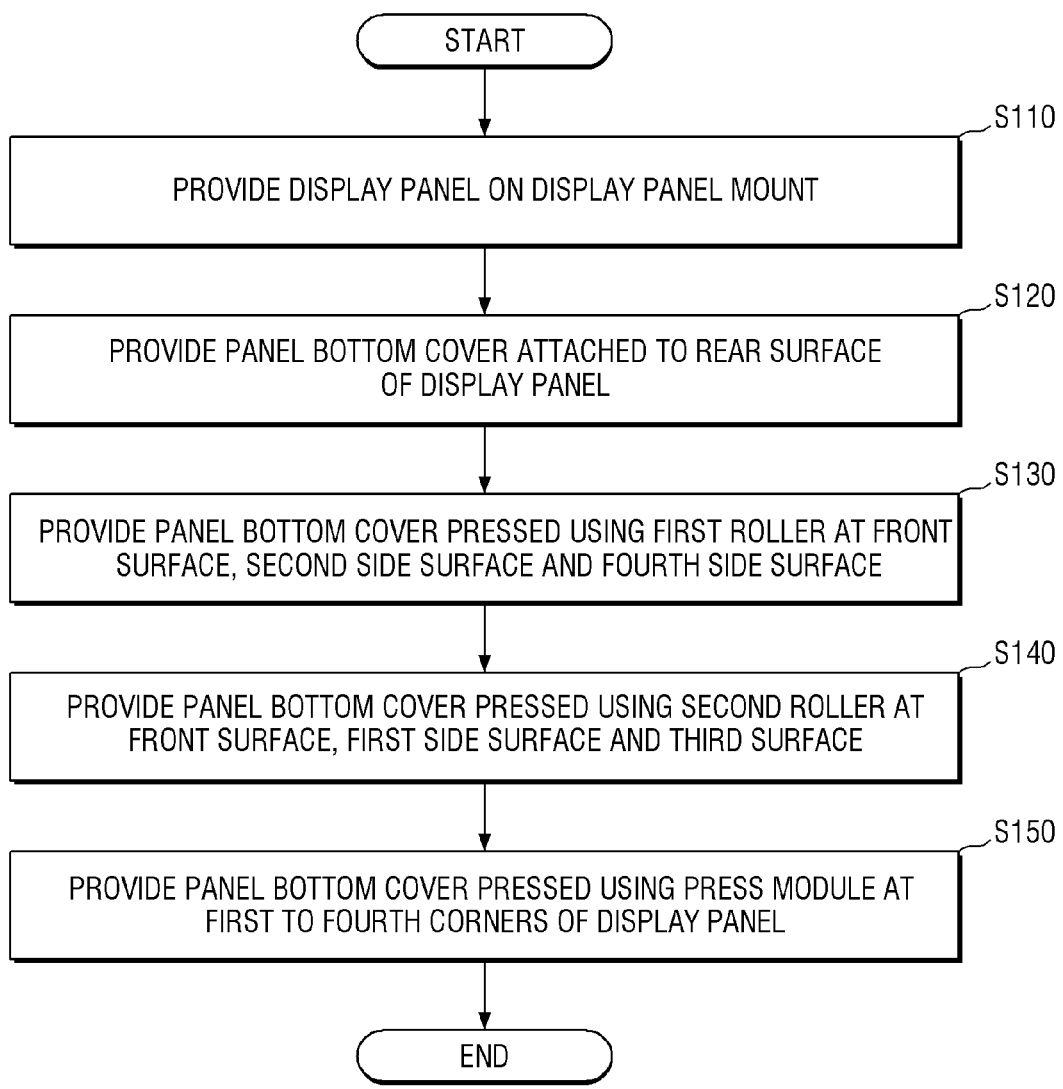
FIG. 8 is a flowchart illustrating an embodiment of a method for attaching a display panel to a panel bottom cover.
Figure 9:
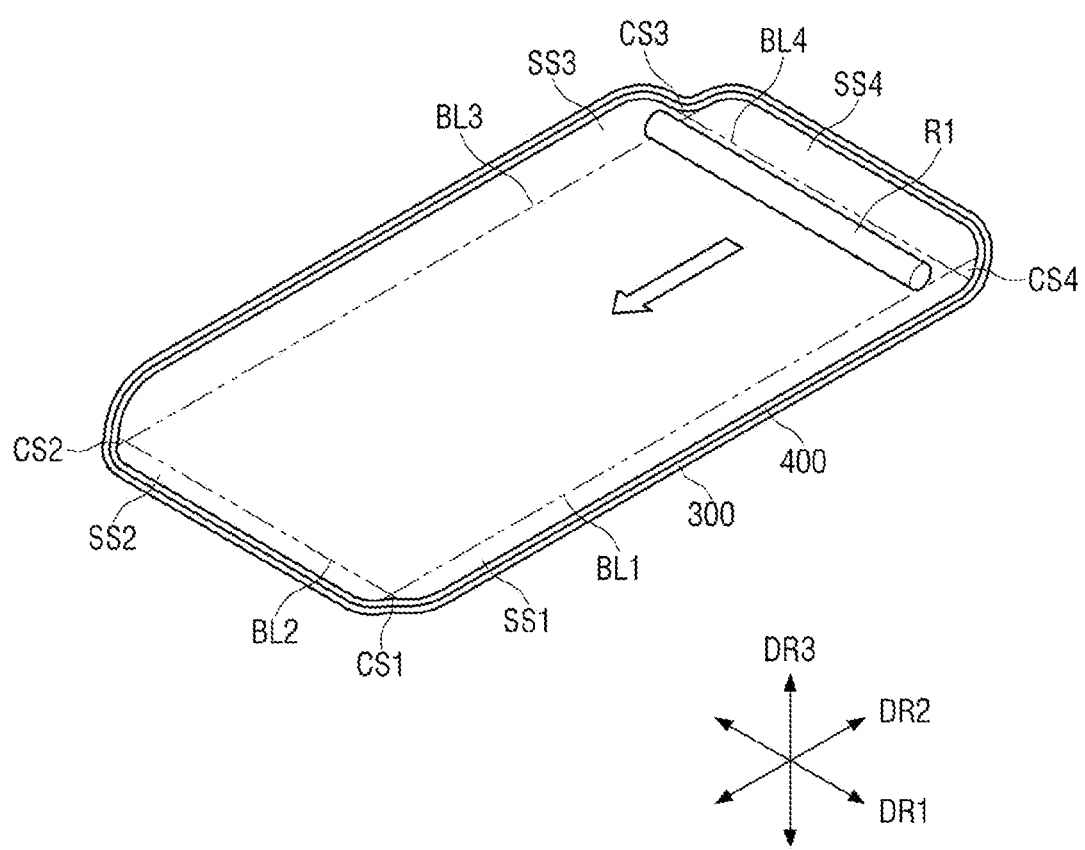
FIG. 9 is a diagram showing an embodiment of a first rolling method for attaching the panel bottom cover to the front surface, the second side surface and the fourth side surface of the display panel.
Figure 10:
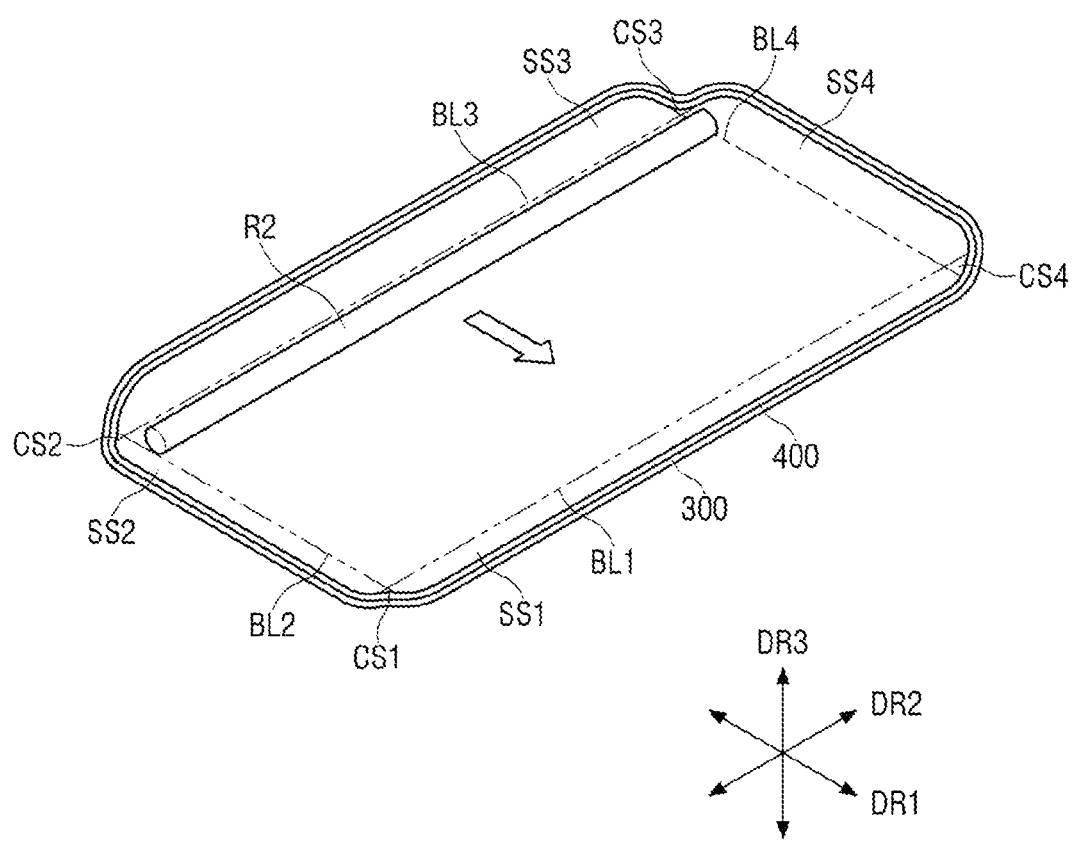
FIG. 10 is a diagram showing an embodiment of a second rolling method for attaching the panel bottom cover to the front surface, the first side surface and the third side surface of the display panel.
Figure 11:
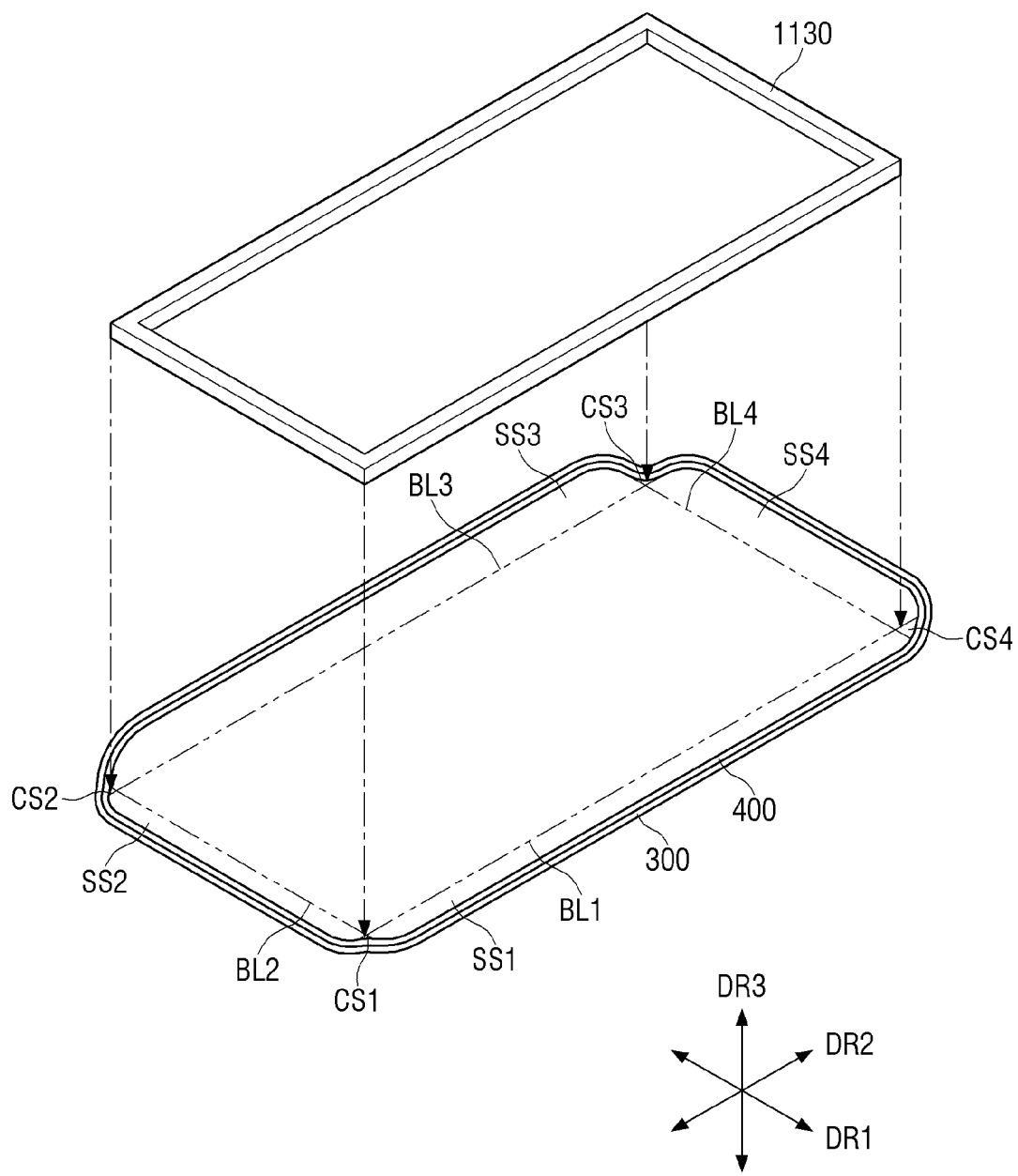
FIG. 11 is a diagram showing an embodiment of a corner-pressing method for attaching the panel bottom cover to the first to fourth corners of the display panel.

FIG. 8 is a flowchart illustrating an embodiment of a method for attaching a display panel 300 to a panel bottom cover 400. FIG. 9 is a rear perspective view of an embodiment of a first rolling method in a method of providing the panel bottom cover 400 pressed or attached to the front surface FS, the second side surface SS2 and the fourth side surface SS4 of the display panel 300. FIG. 10 is a rear perspective view of an embodiment of a second rolling method in a method of providing the panel bottom cover 400 pressed or attached to the front surface FS, the first side surface SS1 and the third side surface SS3 of the display panel 300. FIG. 11 is a rear perspective view of an embodiment of a corner pressing method in a method of providing the panel bottom cover 400 pressed or attached to the first to fourth corners CS1, CS2, CS3 and CS4 of the display panel 300.

Although each of the first side surface SS1, the second side surface SS2, the third side surface SS3 and the fourth side surface SS4 is extended bent from the front surface FS at an angle of about 90 degrees or less in the method for providing the display panel 300 attached to the panel bottom cover 400 in FIGS. 8 to 11, the invention is not limited thereto. In an embodiment, for example, the method of providing the panel bottom cover 400 attached to the display panel 300 shown in FIGS. 8 to 11 can be equally applied to a display panel 300 having the first side surface SS1, the second side surface SS2, the third side surface SS3 and the fourth side surface SS4 extended bent from the front surface FS at an angle of about 90 degrees or greater.

As shown in FIG. 9, the display panel 300 is provided or placed on a panel mount 1500 or stage (see FIG. 19) (S110 of FIG. 8).

Figure 19:
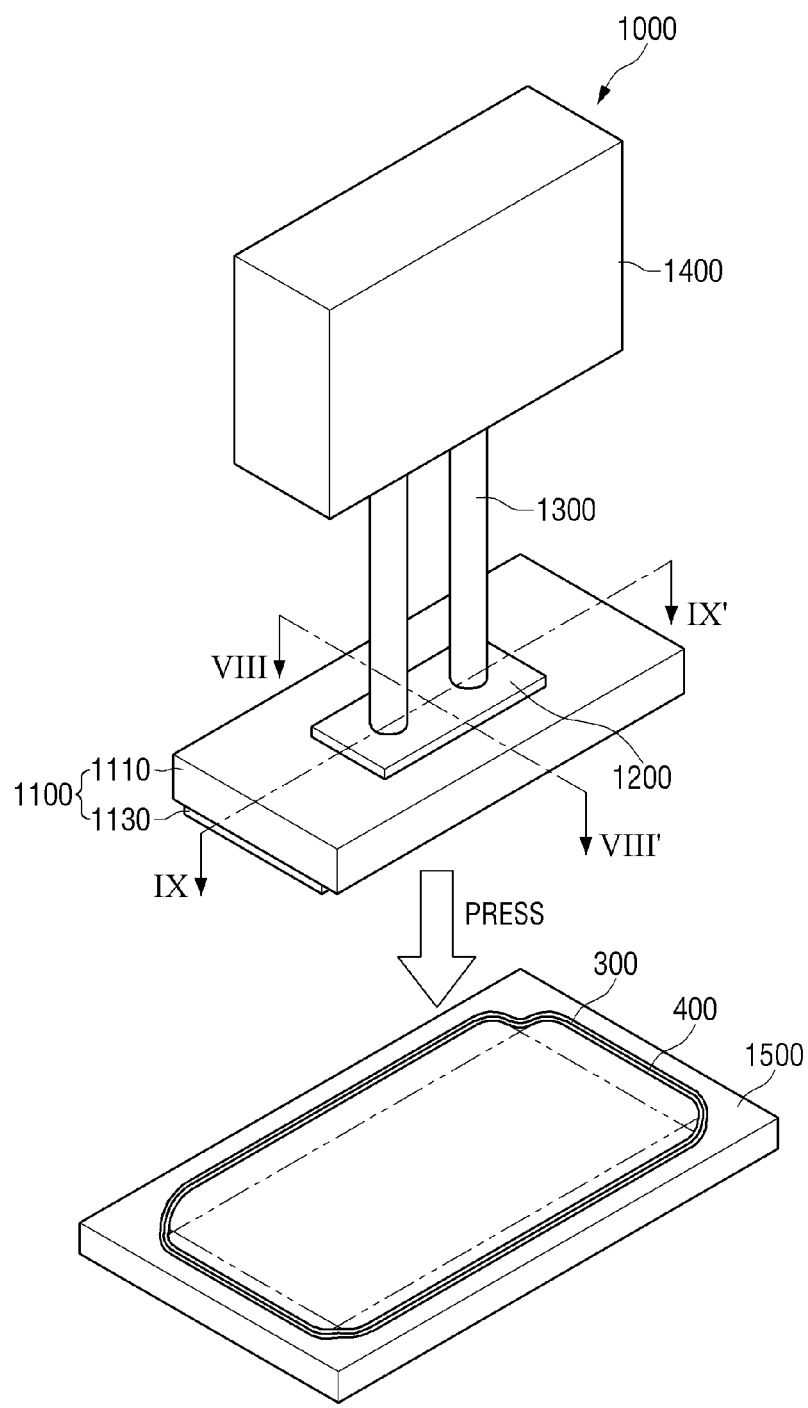
FIG. 19 is a perspective view showing an embodiment of an apparatus for attaching a display panel.

The front surface FS of the display panel 300 may face an upper surface of the panel mount 1500 (see FIG. 19). The panel mount 1500 (see FIG. 19) supports the display panel 300 so that the display panel 300 is not damaged when a force is applied to the rear surface of the display panel 300 such as by being pressed by a roller or a pressing module 1100. To this end, the front surface of the panel mount 1500 (see FIG. 19) may have a recessed shape substantially conforming to the curved shape of the front surface FS of the display panel 300.

As shown in FIG. 9, the panel bottom cover 400 is provided facing the rear surface of the display panel 300 (S120 of FIG. 8). The panel bottom cover 400 is provided contacting the rear surface of the display panel 300 such as to be considered preliminarily attached thereto (e.g., with or without an attachment member therebetween). As described above, the panel bottom cover 400 may be attached to the rear surface of the display panel 300 such as by an adhesive member (e.g., attachment member). In providing the panel bottom cover 400 facing the rear surface of the display panel 300, the adhesive member may be provided between the panel bottom cover 400 which faces the rear surface of the display panel 300, without being limited thereto.

As shown in FIG. 9, a first lamination process includes pressing corresponding portions of the panel bottom cover 400 along the front surface FS, the second side surface SS2 and the fourth side surface SS4 of the display panel 300, such as by using a first roller R1 (S130 in FIG. 8).

The first roller R1 may have a length which extends along the first direction DR1 and may be rolled along the second direction DR2 to correspond to each of the front surface FS, the second side surface SS2 and the fourth side surface SS4 of the display panel 300. The first roller R1 may press the panel bottom cover 400 toward the display panel 300 while rolling from the fourth side surface SS4 of the display panel 300 to the second side surface SS2 along the front surface FS. Alternatively, the first roller R1 may press the panel bottom cover 400 toward the display panel 300 while rolling from the front surface FS to the second side surface SS2 of the display panel 300, back to the front surface FS, and then from the front surface FS to the fourth side surface SS4 of the display panel 300.

As shown in FIG. 10, a second lamination process includes pressing corresponding portions of the panel bottom cover 400 along the front surface FS, the first side surface SS1 and the third side surface SS3 of the display panel 300 such as by using a second roller R2 (S140 in FIG. 8).

The second roller R2 may have a length which extends along the second direction DR2 and may be rolled along the first direction DR1 to correspond to each of the front surface FS, the first side surface SS1 and the third side surface SS3 of the display panel 300. Since the length of the front surface FS of the display panel 300 which is extended along the second direction DR2 may be larger than the length thereof which is extended along the first direction DR1, the length of the second roller R2 may be larger than the length of the first roller R1. That is, the first roller R1 and the second roller R2 may have different lengths corresponding to respective lengths of the panel bottom cover 400 and the display panel 300. The second roller R2 may press the panel bottom cover 400 toward the display panel 300 while rolling from the fourth side surface SS4 of the display panel 300 to the third side surface SS3 along the front surface FS. Alternatively, the second roller R2 may press the panel bottom cover 400 toward the display panel 300, while rolling from the front surface FS to the first side surface SS1 of the display panel 300, back to the front surface FS, and then from the front surface FS to the third side surface SS3 of the display panel 300.

As shown in FIG. 11, corresponding portions of the panel bottom cover 400 are pressed toward the first to fourth corners CS1, CS2, CS3 and CS4 of the display panel 300 such as by using a pressing pad 1130 of a pressing module 1100 (S150 in FIG. 8).

The pressing pad 1130 may have a shape of a square frame in a plan view. The pressing pad 1130 may be movable vertically along the third direction DR3. The pressing pad 1130 may move downward and respectively press corresponding portions of the panel bottom cover 400 toward the display panel 300 at the first to fourth corners CS1, CS2, CS3 and CS4 of the display panel 300. Since the pressing pad 1130 has a shape of a square frame in a plan view, pressing of corresponding portions of the panel bottom cover 400 at the first to fourth side surfaces SS1, SS2, SS3 and SS4 of the display panel 300 as well as at the first to fourth corners CS1, CS2, CS3 and CS4 of the display panel 300 is possible. The pressing module 1100 (see FIG. 19) including the pressing pad 1130 will be described later with reference to FIG. 19. In an embodiment, the pressing pad 1130 presses corresponding portions of the panel bottom cover 400 to the first to fourth side surfaces SS1, SS2, SS3 and SS4 of the display panel 300 as well as to the first to fourth corners CS1, CS2, CS3 and CS4 of the display panel 300 substantially simultaneously (e.g., at a same time).

As shown in FIGS. 8 to 11, when the display panel 300 is a four-sided display panel including the front surface FS, the first to fourth side surfaces SS1, SS2, SS3 and SS4, and the first to fourth corners CS1, CS2, CS3 and CS4, pressing of corresponding portions of the panel bottom cover 400 toward the display panel 300 at the first to fourth corners CS1, CS2, CS3 and CS4 by using the pressing pad 1130 having a shape of a square frame in a plan view is possible. Therefore, delamination of corresponding portions of the panel bottom cover 400 at the first to fourth corners CS1, CS2, CS3 and CS4 of the display panel 300 may be reduced or effectively prevented.

Figure 12:
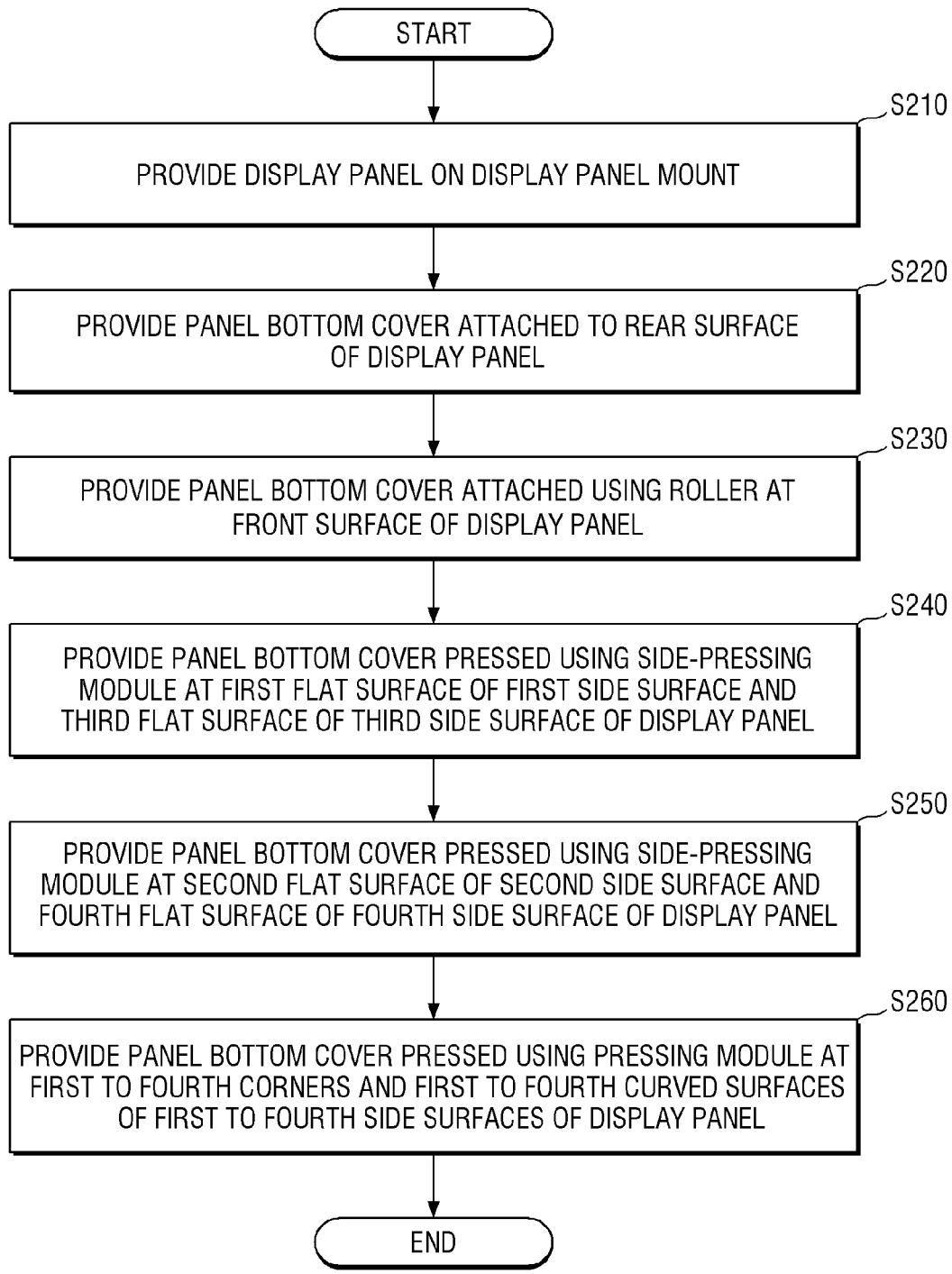
FIG. 12 is a flowchart illustrating an embodiment of a method for attaching a display panel to a panel bottom cover.
Figure 13:
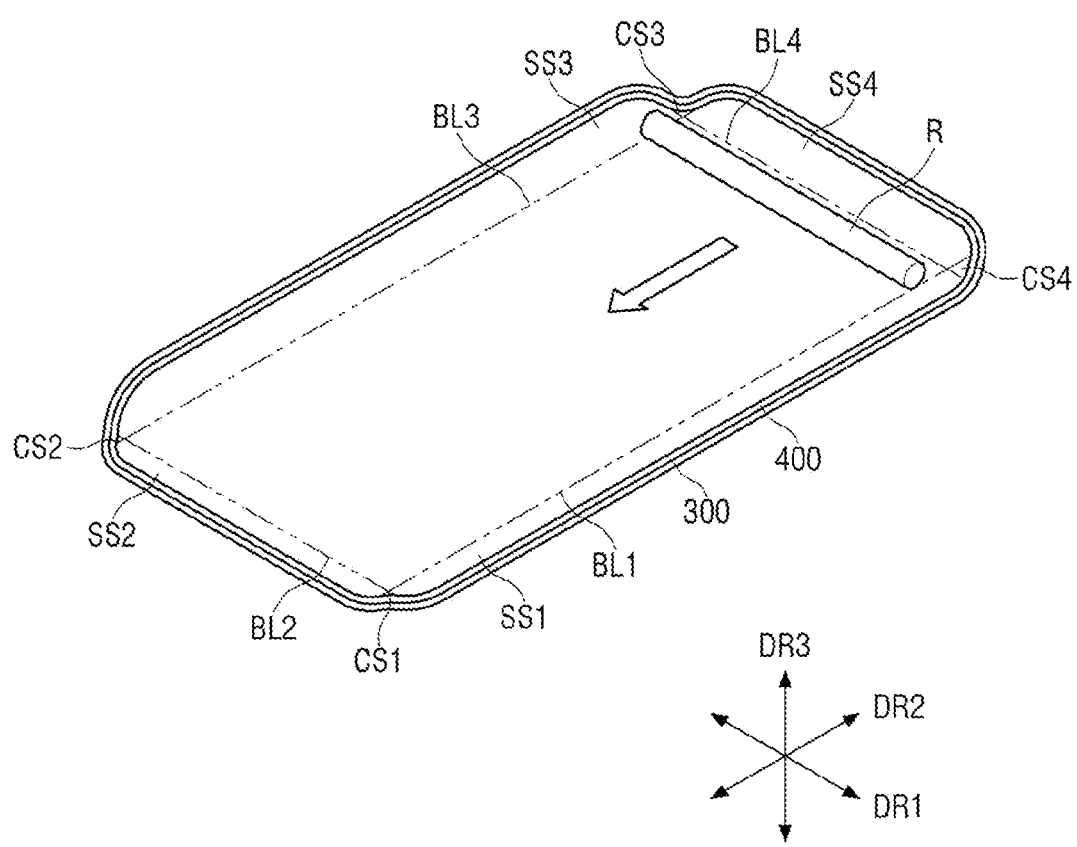
FIG. 13 is a diagram showing an embodiment of a rolling method for attaching the front surface of the display panel.
Figure 14:
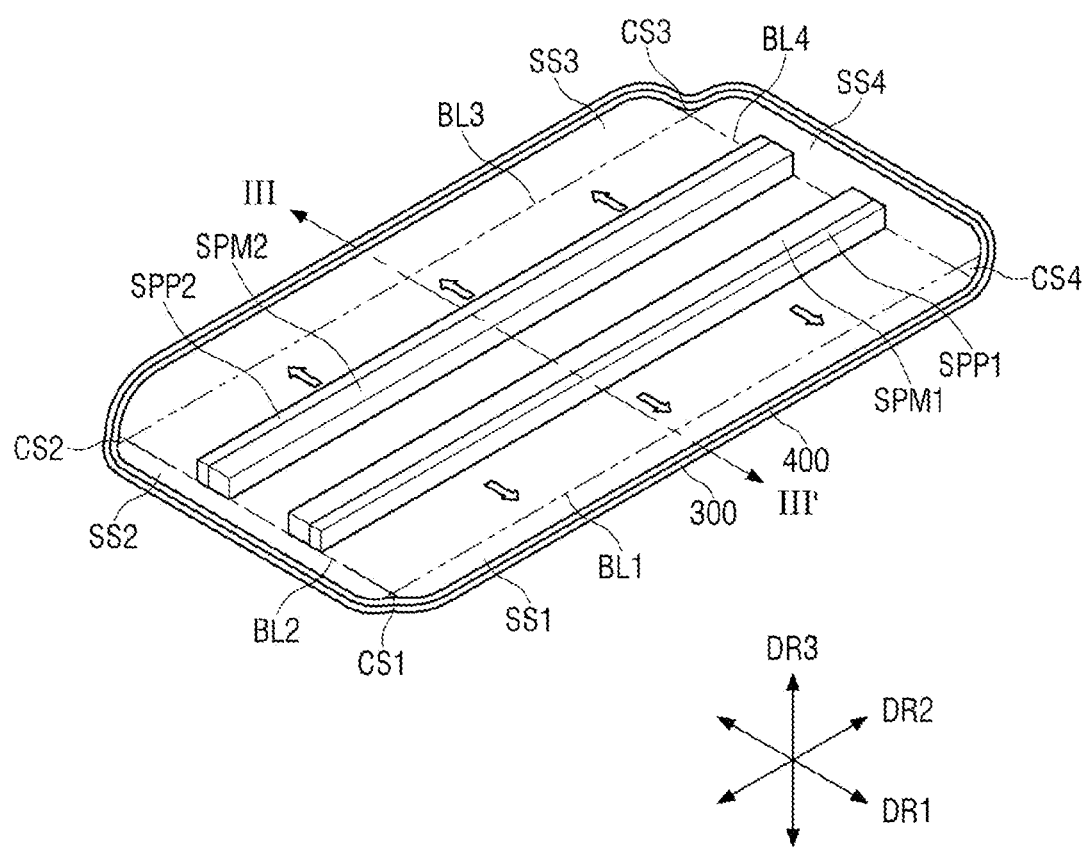
FIGS. 14 and 15 are diagrams showing an embodiment of a first side-pressing method for attaching the panel bottom cover to the first side surface and the third side surface of the display panel.
Figure 15:
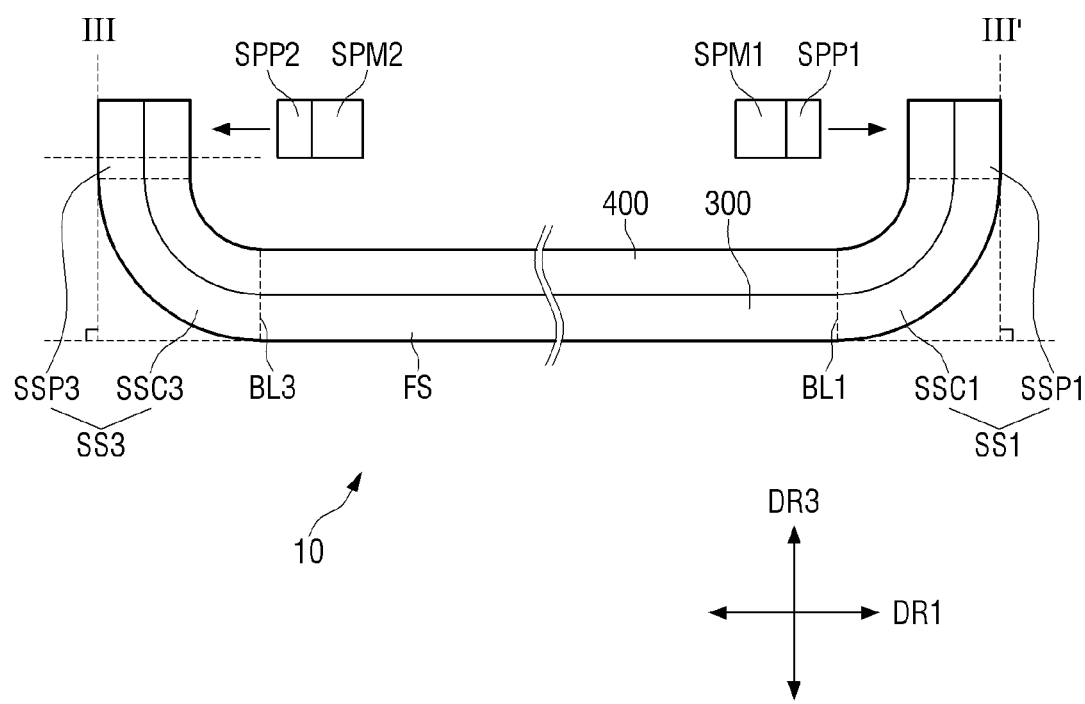
Figure 16:
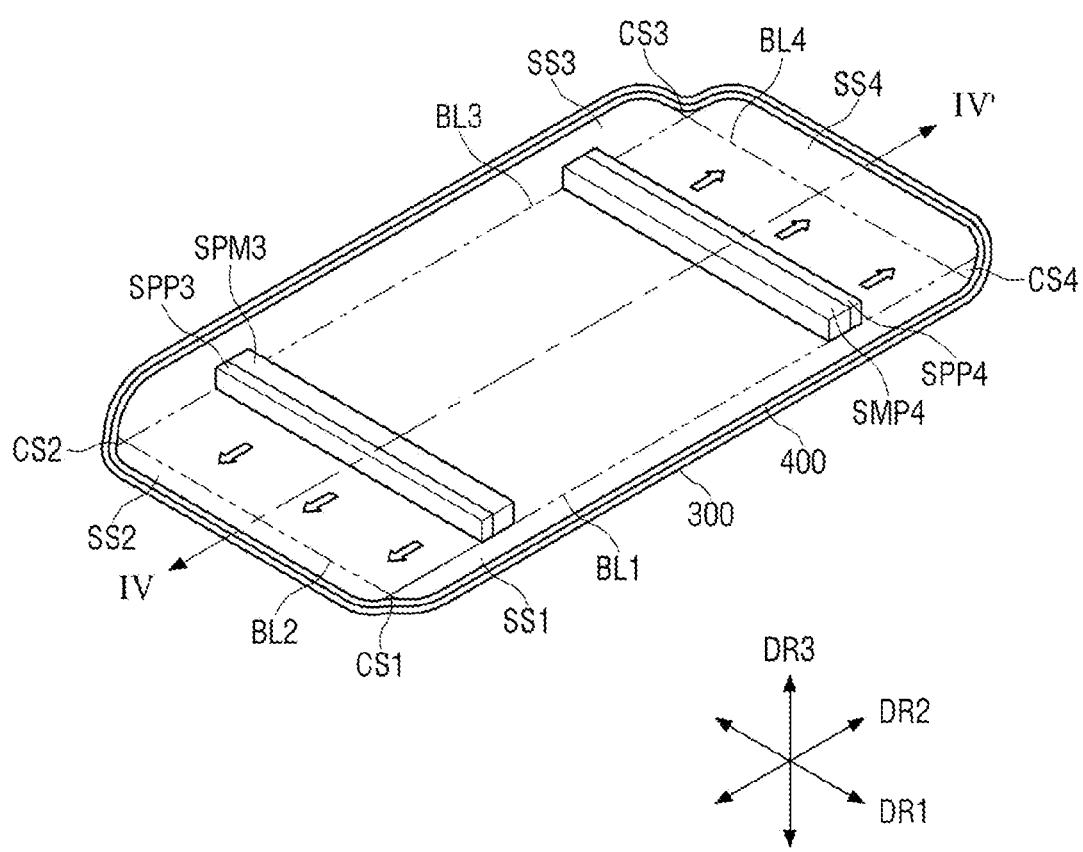
FIGS. 16 and 17 are diagrams showing an embodiment of a second side-pressing method for attaching the panel bottom cover to the second side surface and the fourth side surface of the display panel.
Figure 17:
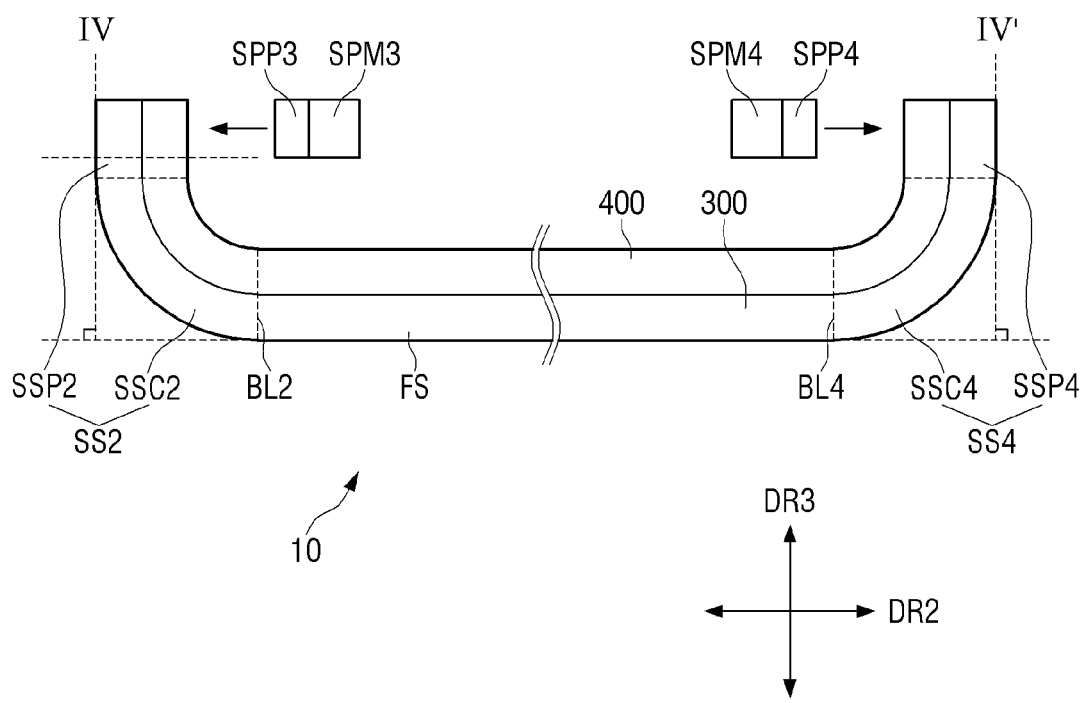
Figure 18:
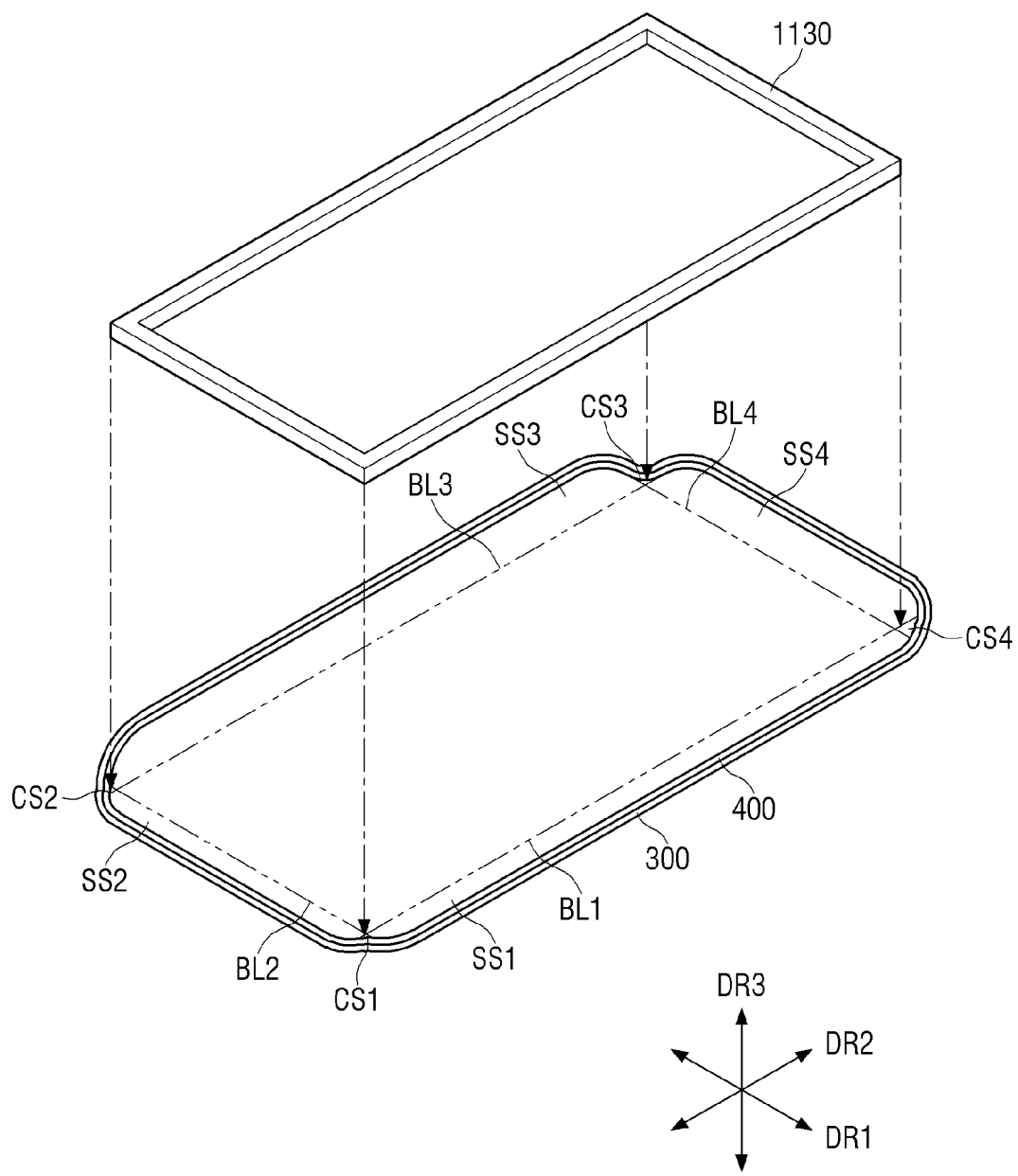
FIG. 18 is a diagram showing an embodiment of a corner-pressing method for attaching the panel bottom cover to the first to fourth corners of the display panel.

FIG. 12 is a flowchart illustrating an embodiment of a method for attaching a display panel 300 to a panel bottom cover 400. FIG. 13 is a rear perspective view of an embodiment of a rolling method in a method of providing the panel bottom cover 400 pressed or attached to the front surface FS of the display panel 300. FIGS. 14 and 15 are rear perspective and cross-sectional views of an embodiment of a first side-pressing method in a method of providing the panel bottom cover 400 pressed or attached to the first side surface SS1 and the third side surface SS3 of the display panel 300. FIGS. 16 and 17 are rear perspective and cross-sectional views of an embodiment of a second side-pressing method in a method for providing the panel bottom cover 400 pressed or attached to the second side surface SS2 and the fourth side surface SS4 of the display panel 300. FIG. 18 is a rear perspective view of an embodiment of a corner-pressing method in a method for providing the panel bottom cover 400 pressed or attached to the first to fourth corners CS1, CS2, CS3 and CS4 of the display panel 300.

Although each of the first side surface SS1, the second side surface SS2, the third side surface SS3 and the fourth side surface SS4 is extended bent from the front surface FS at the angle of about 90 degrees in FIGS. 12 to 18, the invention is not limited thereto. In an embodiment, for example, the method of providing the panel bottom cover 400 attached to the display panel 300 shown in FIGS. 12 to 18 can be equally applied to a display panel 300 having the first side surface SS1, the second side surface SS2, the third side surface SS3 and the fourth side surface SS4 extended bent from the front surface FS at an angle of less or greater than about 90 degrees.

Referring to FIG. 12, processes in S210 and S220 are substantially identical to S110 and S120 of FIG. 8. Therefore, redundant descriptions will be omitted.

As shown in FIG. 13, a lamination process of pressing includes applying a force (e.g., pressing force) to press a corresponding portion of the panel bottom cover 400 to the front surface FS of the display panel 300 such as by using a third roller R (S230 in FIG. 12).

Although the third roller R includes a length which is extended along the first direction DR1 and rolls along the second direction DR2 in FIG. 13, the process in S230 is not limited thereto. In an embodiment, the third roller R may include a length which is extended along the second direction DR2 and may roll along the first direction DR1.

As shown in FIGS. 14 and 15, corresponding portions of the panel bottom cover 400 are pressed to the display panel 300 at the first flat surface SSP1 of the first side surface SS1 and the third flat surface SSP3 of the third side surface SS3 of the display panel 300 such as by using a first side-pressing module SPM1 and a second side-pressing module SPM2 (S240 of FIG. 12).

FIG. 15 shows a cross-sectional view of the display panel 300 and the panel bottom cover 400 taken along line III-III' of FIG. 14.

Referring to FIGS. 14 and 15, the first side-pressing module SPM1 and the second side-pressing module SPM2 may be movable along the first direction DR1. The first side-pressing module SPM1 may include a first side-pressing pad SPP1 extended toward and facing the first flat surface SSP1 of the first side surface SS1 of the display panel 300. The second side-pressing module SPM2 may include a second side-pressing pad SPP2 extended toward and facing the third flat surface SSP3 of the third side surface SS3 of the display panel 300. A respective side-pressing pad may define a distal end of a respective side-pressing module.

The first side-pressing module SPM1 may move along the first direction DR1 and along the front surface FS of the display panel 300, thereby pressing a corresponding portion of the panel bottom cover 400 to the first flat surface SSP1 of the first side surface SS1 using the first side-pressing pad SPP1. The second side-pressing module SPM2 may move along the first direction DR1 and along the front surface FS of the display panel 300, thereby pressing a corresponding portion of the panel bottom cover 400 to the third flat surface SSP3 of the third side surface SS3 using the second side-pressing pad SPP2. When the first side-pressing module SPM1 moves along the first direction DR1, the second side-pressing module SPM2 moves in a direction opposite to the first side-pressing module SPM1. In other words, the first side-pressing module SPM1 and the second side-pressing module SPM2 may move in in a direction towards each other and a direction opposite to each other (e.g., opposite directions). Since a corresponding portion of the panel bottom cover 400 is pressed to the front surface FS of the display panel 300 such as by using a third roller R (S230 in FIG. 12), a respective side-pressing module may be spaced apart from the front surface FS as shown in FIG. 15, without being limited thereto.

As shown in FIGS. 16 and 17, corresponding portions of the panel bottom cover 400 are pressed to the display panel 300 at the second flat surface SSP2 of the second side surface SS2 and the fourth flat surface SSP4 of the fourth side surface SS4 of the display panel 300 such as by using a third side-pressing module SPM3 and a fourth side-pressing module SPM4 (S250 in FIG. 12).

FIG. 17 shows a cross-sectional view of the display panel 300 and the panel bottom cover 400, taken along line IV-IV' of FIG. 16.

Referring to FIGS. 16 and 17, the third side-pressing module SPM3 and the fourth side-pressing module SPM4 may be movable along the second direction DR2. The third side-pressing module SPM3 may include a third side-pressing pad SPP3 extended toward and facing the second flat surface SSP2 of the second side surface SS2 of the display panel 300. The fourth side-pressing module SPM4 may include a fourth side-pressing pad SPP4 extending toward and facing the fourth flat surface SSP4 of the fourth side surface SS4 of the display panel 300.

The third side-pressing module SPM3 may move along the second direction DR2 and along the front surface FS of the display panel 300, thereby pressing a corresponding portion the panel bottom cover 400 to the second flat surface SSP2 of the second side surface SS2 using the third side-pressing pad SPP3. The fourth side-pressing module SPM4 may move along the second direction DR2 and along the front surface FS of the display panel 300, thereby pressing a corresponding portion of the panel bottom cover 400 at the fourth flat surface SSP4 of the fourth side surface SS4 using the fourth side-pressing pad SPP4. When the third side-pressing module SPM3 moves along the second direction DR2, the fourth side-pressing module SPM4 moves in a direction opposite to the third side-pressing module SPM3.

In other words, the third side-pressing module SPM3 and the fourth side-pressing module SPM4 may move in opposing directions.

As shown in FIG. 18, corresponding portions of the panel bottom cover 400 are pressed at the first to fourth corners CS1, CS2, CS3 and CS4 and the first to fourth curved surfaces SSC1, SSC2, SSC3 and SSC4 of the first to fourth side surfaces SS1, SS2, SS3 and SS4 of the display panel 300 such as by using the pressing pad 1130 of the pressing module 1100 (S260 of FIG. 12).

The pressing pad 1130 may have a shape of a square frame in a plan view. The pressing pad 1130 may be movable vertically along the third direction DR3. The pressing pad 1130 may move downward and respectively press corresponding portions of the panel bottom cover 400 toward the display panel 300 at the first to fourth corners CS1, CS2, CS3 and CS4 of the display panel 300. Since the pressing pad 1130 has a shape of a square frame in a plan view, pressing of corresponding portions of the panel bottom cover 400 at the first to fourth curved surfaces SSC1, SSC2, SSC3 and SSC3 of the first to fourth side surfaces SS1, SS2, SS3 and SS4 of the display panel 300 as well as the first to fourth corners CS1, CS2, CS3 and CS4 of the display panel 300 is possible.

As shown in FIGS. 12 to 18, when the display panel 300 is a four-sided display panel including the front surface FS, the first to fourth side surfaces SS1, SS2, SS3 and SS4, and the first to fourth corners CS1, CS2, CS3 and CS4, pressing of the corresponding portions of the panel bottom cover 400 toward the display panel 300 at the first to fourth corners CS1, CS2, CS3 and CS4 by using the pressing pad 1130 having a shape of a square frame in a plan view is possible. Therefore, delamination of corresponding portions of the panel bottom cover 400 at the first to fourth corners CS1, CS2, CS3 and CS4 of the display panel 300 may be reduced or effectively prevented.

In addition, when each of the first side surface SS1, the second side surface SS2, the third side surface SS3 and the fourth side surface SS4 is extended bent at the angle of about 90 degrees from the front surface FS, the first side surface SS1 includes the first curved surface SSC1 and the first flat surface SSP1, the second side surface SS2 includes the second curved surface SSC2 and the second flat surface SSP2, the third side surface SS3 includes the third curved surface SSC3 and the third flat surface SSP3, and the fourth side surface SS4 includes the fourth curved surface SSC4 and the fourth flat surface SSP4. With the angle of about 90 degrees, it may be difficult to respectively press corresponding portions of the panel bottom cover 400 to the first curved surface SSC1, the second curved surface SSC2, the third curved surface SSC3 and the fourth curved surface SSC4 using the third roller R and the side-pressing modules. In one more embodiment, by using the pressing pad 1130 having the shape of the square frame in a plan view, pressing of corresponding portions of the panel bottom cover 400 to the first curved surface SSC1, the second curved surface SSC2, the third curved surface SSC3 and the fourth curved surface SSC4 is possible. Therefore, error or failure attachment of the panel bottom cover 400 to the display panel 300 at the first to fourth curved surfaces SSC1, SSC2, SSC3 and SSC4 of the display panel 300 may be reduced or effectively prevented.

Figure 20:
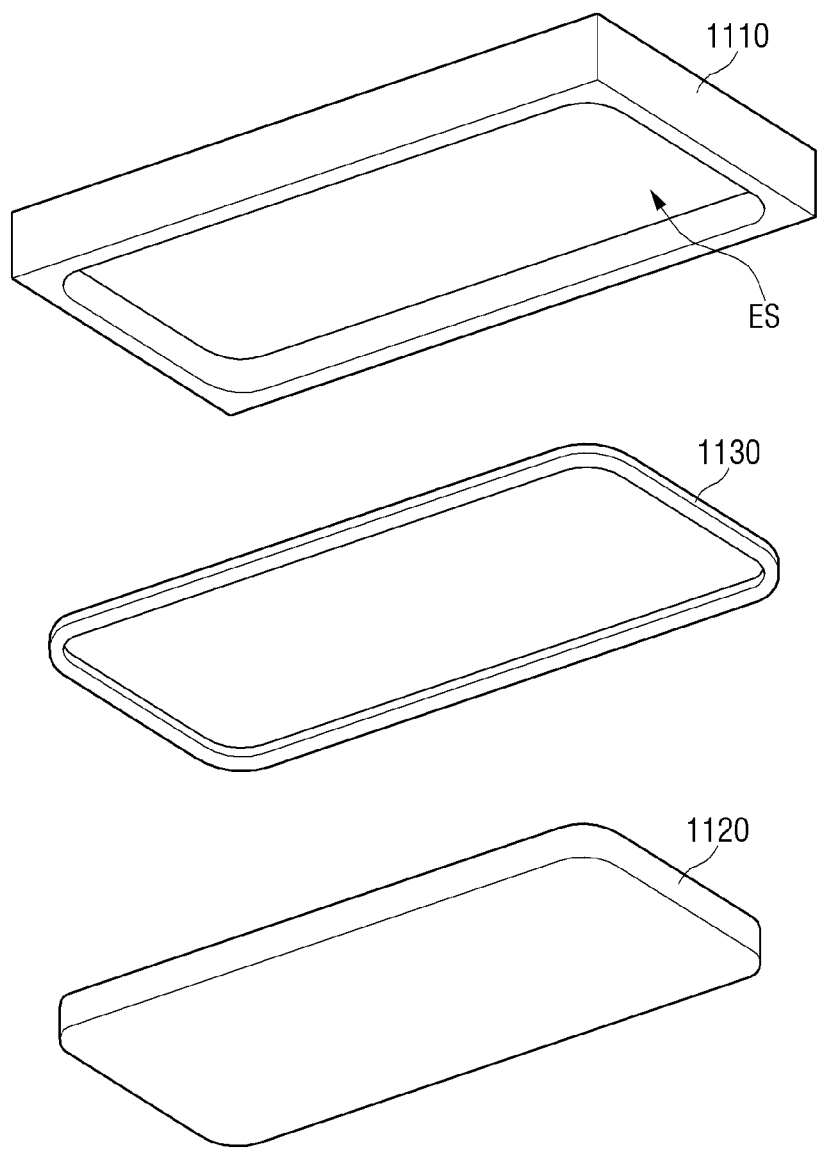
FIG. 20 is an exploded perspective view showing an embodiment of the pressing module of FIG. 19.
Figure 21:
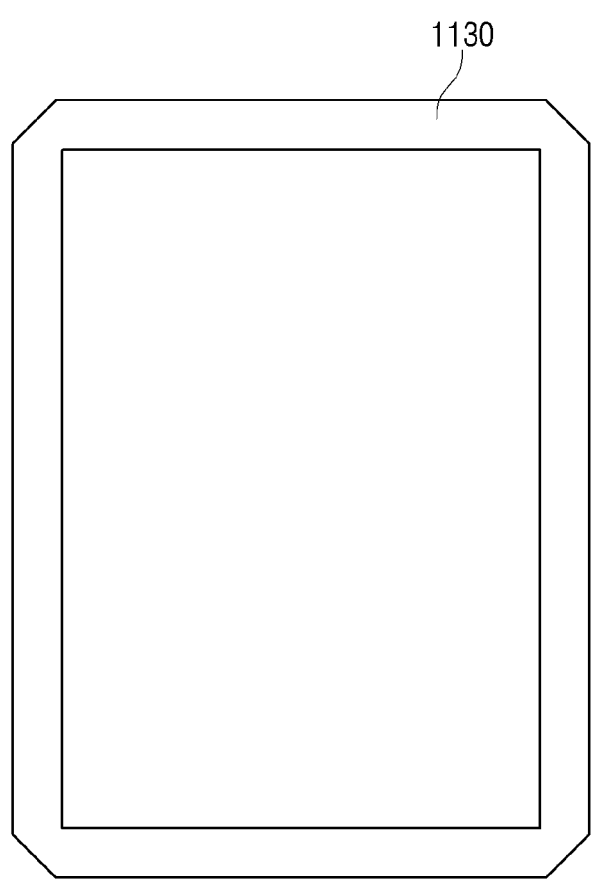
FIG. 21 is a plan view showing an embodiment of the pressing pad of FIG. 20.
Figure 22:
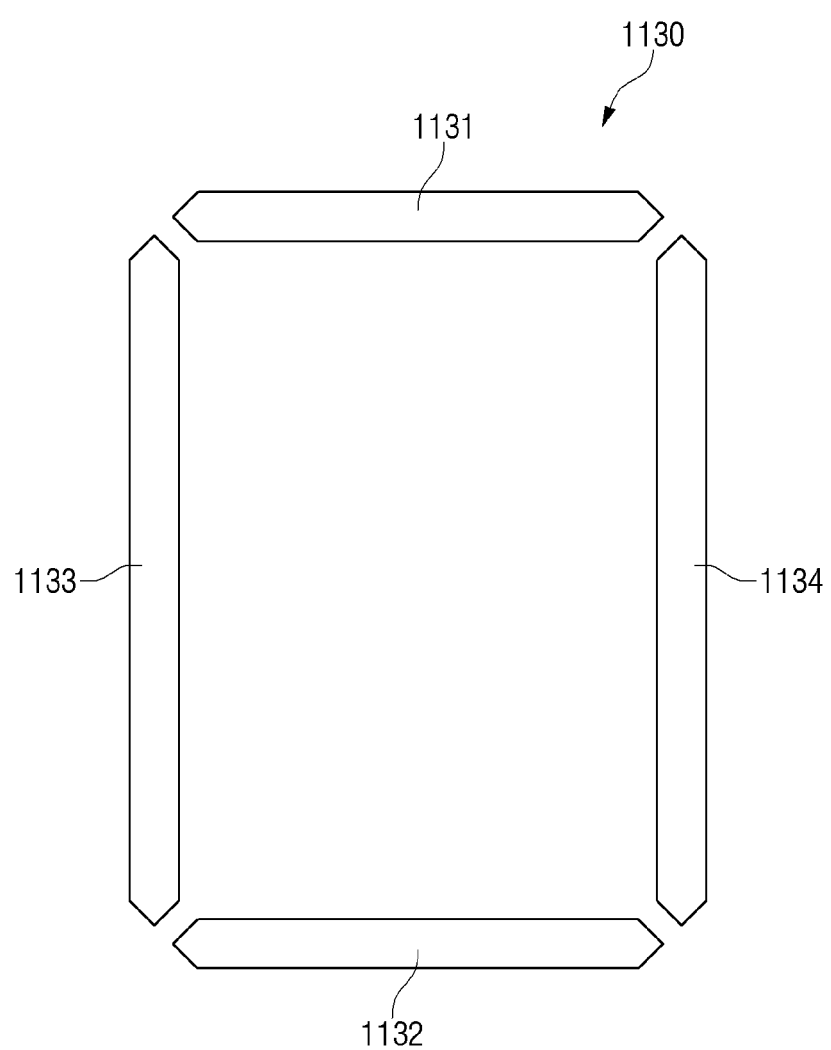
FIG. 22 is a plan view showing an embodiment of the pressing pad of FIG. 20.
Figure 23:
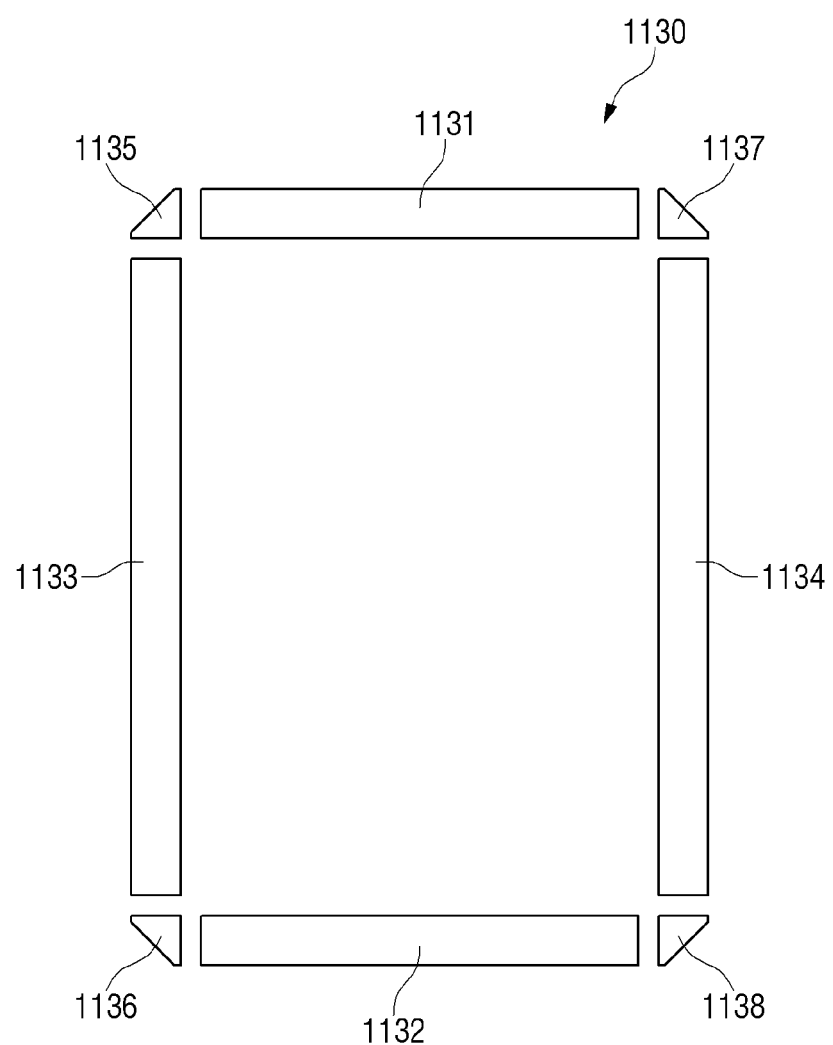
FIG. 23 is a plan view showing an embodiment of the pressing pad of FIG. 20.

FIG. 19 is a perspective view showing an embodiment of an apparatus 1000 for attaching a display panel 300 to another object. FIG. 20 is an exploded perspective view of the pressing module 1100 of FIG. 19. FIGS. 21, 22 and 23 are plan views of embodiments of a pressing pad 1130.

Referring to FIGS. 19 and 20, an apparatus 1000 for attaching a display panel 300 includes a pressing module 1100, a module fixing portion 1200, a module moving member 1300, a moving controller 1400, and a panel mount 1500.

The pressing module 1100 includes a first bracket 1110, a second bracket 1120 and a pressing pad 1130. The first bracket 1110 and the second bracket 1120 may be elements for fixing the pressing module 1100 relative to the apparatus 1000. The first bracket 1110 and the second bracket 1120 may together define a pressing bracket to which the pressing pad 1130 is fixed for applying a pressing force.

A portion of the central area of the lower surface of the first bracket 1110 may be open. An empty space ES (e.g., bracket opening) at the central area of the first bracket 1110, such as recessed from a lower surface of the first bracket 1110.

The second bracket 1120 and the pressing pad 1130 may be disposable into the empty space ES of the first bracket 1110. The pressing pad 1130 may be inserted between a sidewall of the first bracket 1110 which defines the empty space ES and the second bracket 1120 so that a position of the pressing pad 1130 is fixed within the first bracket 1110. Specifically, the pressing pad 1130 may be disposed in a first portion of the empty space ES of the first bracket 1110. The second bracket 1120 may be disposed in a second portion (e.g., a remaining space) of the empty space ES after the pressing pad 1130 is disposed. The first bracket 1110 and the second bracket 1120 may be fixed by a separate fixing member.

The first bracket 1110 and the second bracket 1120 serve to support the pressing pad 1130 when the pressing pad 1130 applies a force to press corresponding portions of the panel bottom cover 400. In order to increase the pressing force of the pressing pad 1130 which is applied to portions of the panel bottom cover 400, the first bracket 1110 and the second bracket 1120 may include a material having high hardness. In an embodiment, for example, the first bracket 1110 and the second bracket 1120 may include a metal material.

In addition, since the pressing pad 1130 directly presses portions of the panel bottom cover 400, in order to prevent damage to the panel bottom cover 400 by the pressing pad 1130, the pressing pad 1130 may include a material having low hardness. That is to say, the hardness of the pressing pad 1130 may be lower than each of the hardness of the first bracket 1110 and the hardness of the second bracket 1120. In an embodiment, for example, the pressing pad 1130 may include silicon such as in the form of a silicon pad.

Figure 28:
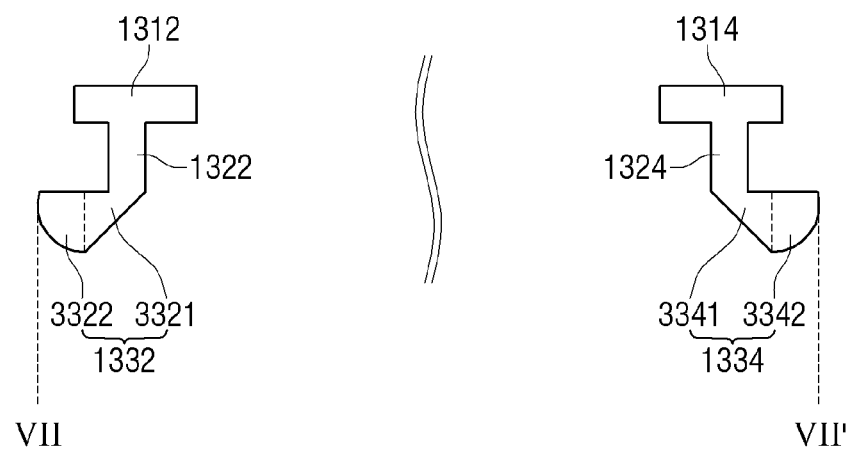
FIG. 28 is a cross-sectional view showing an embodiment of the pressing pad taken along line VII-VII' of FIGS. 24 and 25.

The first bracket 1110 and the second bracket 1120 will be described in detail later with reference to FIGS. 28 and 29.

The pressing pad 1130 may have a shape of a square frame, a square window or a hollow square in a plan view, as shown in FIG. 21. Each of the corners of the pressing pad 1130 may be chamfered or rounded as including an oblique edge extended at an angle, e.g., about 45 degrees relative to a short portion or a long portion of the pressing pad 1130 as shown in FIG. 21. As shown in FIG. 21, the pressing pad 1130 may be defined by a single piece of material having short portions and long portions arranged to define a closed loop shape of a frame or window Referring to FIG. 22, the pressing pad 1130 may include a plurality of pressing pad portions which are arranged to form a closed loop shape of a frame or windows. The separate portions may include a first pressing pad 1131 and a second pressing pad 1132 each lengthwise extended along the first direction DR1, and a third pressing pad 1133 and a fourth pressing pad 1134 each lengthwise extended along the second direction DR2, as shown in FIG. 22. The first pressing pad 1131, the second pressing pad 1132, the third pressing pad 1133 and the fourth pressing pad 1134 may be spaced apart from one another along a shape of the pressing pad 1130. That is, the first pressing pad 1131, the second pressing pad 1132, the third pressing pad 1133 and the fourth pressing pad 1134 are disconnected from each other at corner portions of the pressing pad 1130.

A first end of the first pressing pad 1131 may be disposed adjacent to a second end of the third pressing pad 1133. A second end of the first pressing pad 1131 may be disposed adjacent to a first end of the fourth pressing pad 1134. A second end of the second pressing pad 1132 may be disposed adjacent to the first end of the third pressing pad 1133. A first end of the second pressing pad 1132 may be disposed adjacent to the second end of the fourth pressing pad 1134.

Each of the first end and the second end of the first pressing pad 1131, the first end and the second end of the second pressing pad 1132, the first end and the second end of the third pressing pad 1133, and the first end and the second end of the fourth pressing pad 1134 may have a triangular shape in a plan view. The triangular shapes of adjacent ends together correspond to a shape of a respective corner of the display panel 300 and/or the panel bottom cover 400.

The opposing ends having the triangular shape reduces a gap or space between the first end of the first pressing pad 1131 and the second end of the third pressing pad 1133, and the space between the second end of the first pressing pad 1131 and the first end of the fourth pressing pad 1134. In addition, the space between the second end of the second pressing pad 1132 and the first end of the third pressing pad 1133, and the space between the first end of the second pressing pad 1132 and the second end of the fourth pressing pad 1134 may be reduced. Therefore, even though the first pressing pad 1131, the second pressing pad 1132, the third pressing pad 1133 and the fourth pressing pad 1134 are spaced apart from one another, the pressing force applied from the pressing pad 1130 to press the panel bottom cover 400 can be substantially maintained at the first to four corners CS1, CS2, CS3 and CS4 of the display panel 300.

The pressing pad 1130 may further include a first corner-pressing pad 1135, a second corner-pressing pad 1136, a third corner-pressing pad 1137 and a fourth corner-pressing pad 1138, in addition to the first pressing pad 1131, the second pressing pad 1132, the third pressing pad 1133 and the fourth pressing pad 1134, as shown in FIG. 23. The first pressing pad 1131, the second pressing pad 1132, the third pressing pad 1133, the fourth pressing pad 1134, the first corner-pressing pad 1135, the second corner-pressing pad 1136, the third corner-pressing pad 1137 and the fourth corner-pressing pad 1138 may be spaced apart from one another along a shape of the pressing pad 1130.

The first corner-pressing pad 1135 may be disposed between the first end of the first pressing pad 1131 and the second end of the third pressing pad 1133. The second corner-pressing pad 1136 may be disposed between the second end of the second pressing pad 1132 and the first end of the third pressing pad 1133. The third corner-pressing pad 1137 may be disposed between the second end of the first pressing pad 1131 and the first end of the fourth pressing pad 1134. The fourth corner-pressing pad 1138 may be disposed between the first end of the second pressing pad 1132 and the second end of the fourth pressing pad 1134.

Each of the first corner-pressing pad 1135, the second corner-pressing pad 1136, the third corner-pressing pad 1137 and the fourth corner-pressing pad 1138 may have a triangular shape in a plan view. The triangular shape of a respective corner-pressing pad corresponds to a shape of a respective corner of the display panel 300 and/or the panel bottom cover 400. The corner-pressing pads having the triangular shape reduces the gap or space between the first end of the first pressing pad 1131 and the second end of the third pressing pad 1133, and the space between the second end of the first pressing pad 1131 and the first end of the fourth pressing pad 1134. In addition, the space is reduced between the second end of the second pressing pad 1132 and the first end of the third pressing pad 1133, and the space between the first end of the second pressing pad 1132 and the second end of the fourth pressing pad 1134. Therefore, even though the first pressing pad 1131, the second pressing pad 1132, the third pressing pad 1133, the fourth pressing pad 1134, the first corner-pressing pad 1135, the second corner-pressing pad 1136, the third corner-pressing pad 1137 and the fourth corner-pressing pad 1138 are spaced apart from one another, the pressing force that presses the panel bottom cover 400 can be substantially maintained at the first to four corners CS1, CS2, CS3 and CS4 of the display panel 300.

The module fixing portion 1200 may fix the pressing module 1100 to the module moving member 1300. The module fixing portion 1200 may be attached to the upper surface of the pressing module 1100.

The length of the module moving member 1300 may be adjustable under the control of the moving controller 1400. By adjusting the length of the module moving member 1300, the pressing module 1100 may be movable up and down (e.g., vertical in FIG. 19). In an embodiment, for example, by decreasing the length of the module moving member 1300, the pressing module 1100 may move up or away from the panel mount 1500. By increasing the length of the module moving member 1300, the pressing module 1100 may move down or toward the panel mount 1500. In an embodiment, the pressing module 1100 and the pressing pad 1130 may be movable together in a direction toward the panel mount 1500, and movement of the pressing module 1100 to the panel mount 1500 includes both contacting the pressing pad 1130 to the panel bottom cover 400 at the corner portions of the display panel 300, and applying the pressing force to the panel bottom cover 400 to attach the panel bottom cover 400 to the display panel 300 at the corner portions thereof.

The module moving member 1300 may be provided or formed integrally with the module fixing portion 1200. In an embodiment, for example, the module moving member 1300 may be a cylinder.

The moving controller 1400 may adjust the length of the module moving member 1300. When the module moving member 1300 is a cylinder, the moving controller 1400 may be a motor that drives the cylinder.

The panel mount 1500 may be an element on which the display panel 300 is removably disposed. The panel mount 1500 supports the display panel 300 so that the display panel 300 is not damaged when pressing force is applied to the display panel 300 at the rear surface of the display panel 300 such as by a roller, a pressing module 1100, etc. To this end, the front surface of the panel mount 1500 which faces the pressing module 1100 may have a recessed shape substantially conforming to the shape of the front side surface of the display panel 300.

As shown in FIGS. 19 and 20, the pressing module 1100 includes the pressing pad 1130 that covers the first to fourth side surfaces SS1, SS2, SS3 and SS4 and first to fourth corners CS1, CS2, CS3 and CS4 of the display panel 300.

Accordingly, as the pressing module 1100 moves up and down, corresponding portions of the panel bottom cover 400 may be pressed to the display panel 300 at the first to fourth side surfaces SS1, SS2, SS3 and SS4 and the first to fourth corners CS1, CS2, CS3 and CS4 of the display panel 300 by pressing force applied from the pressing pad 1130. Therefore, failure of attaching the panel bottom cover 400 to the display panel 300 which may occur at the first to fourth side surfaces SS1, SS2, SS3 and SS4 as well as the first to fourth corners CS1, CS2, CS3 and CS4 of the display panel 300 may be reduced or effectively prevented.

Figure 24:
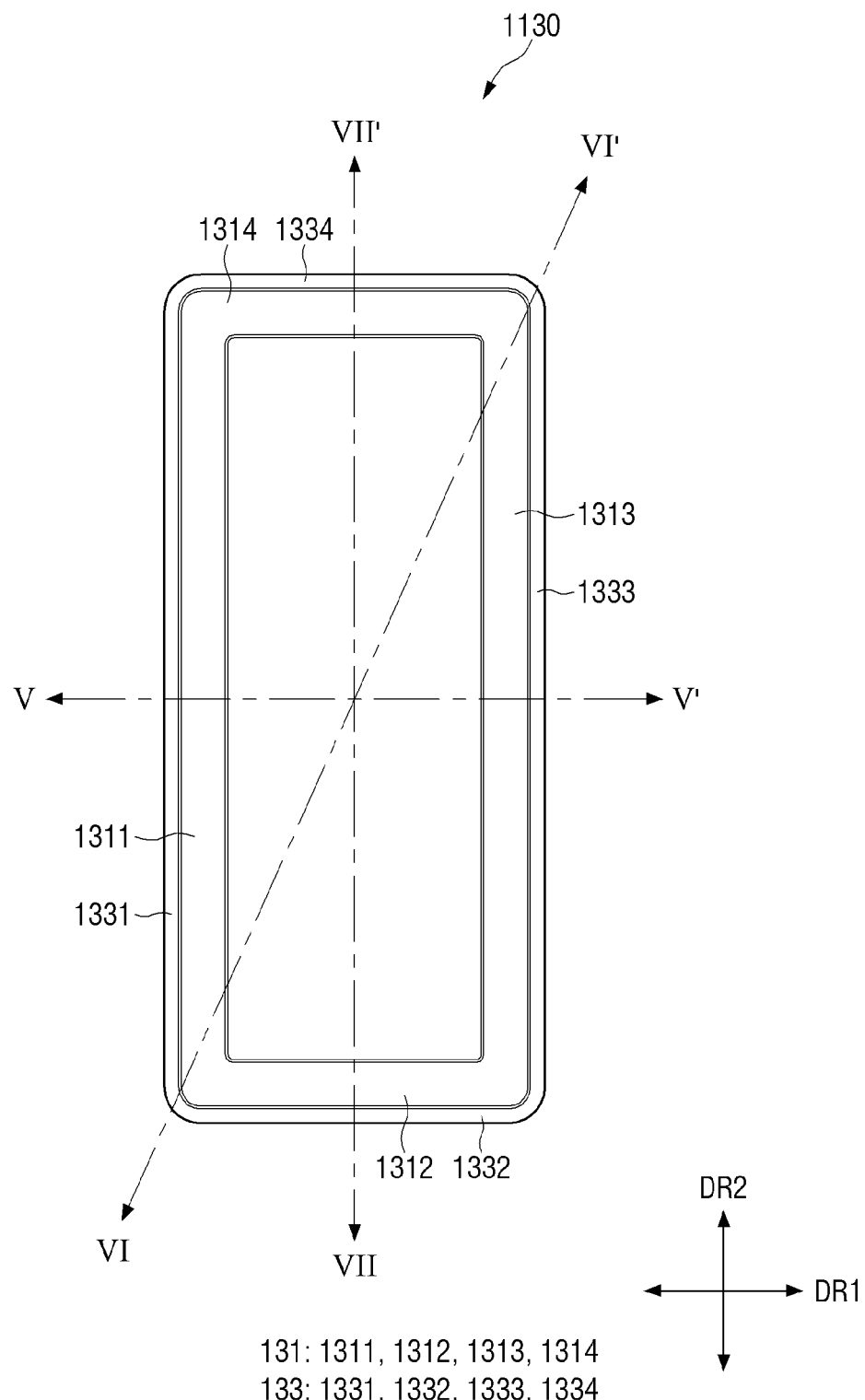
FIG. 24 is a plan view showing an embodiment of the pressing pad of FIG. 20.
Figure 25:
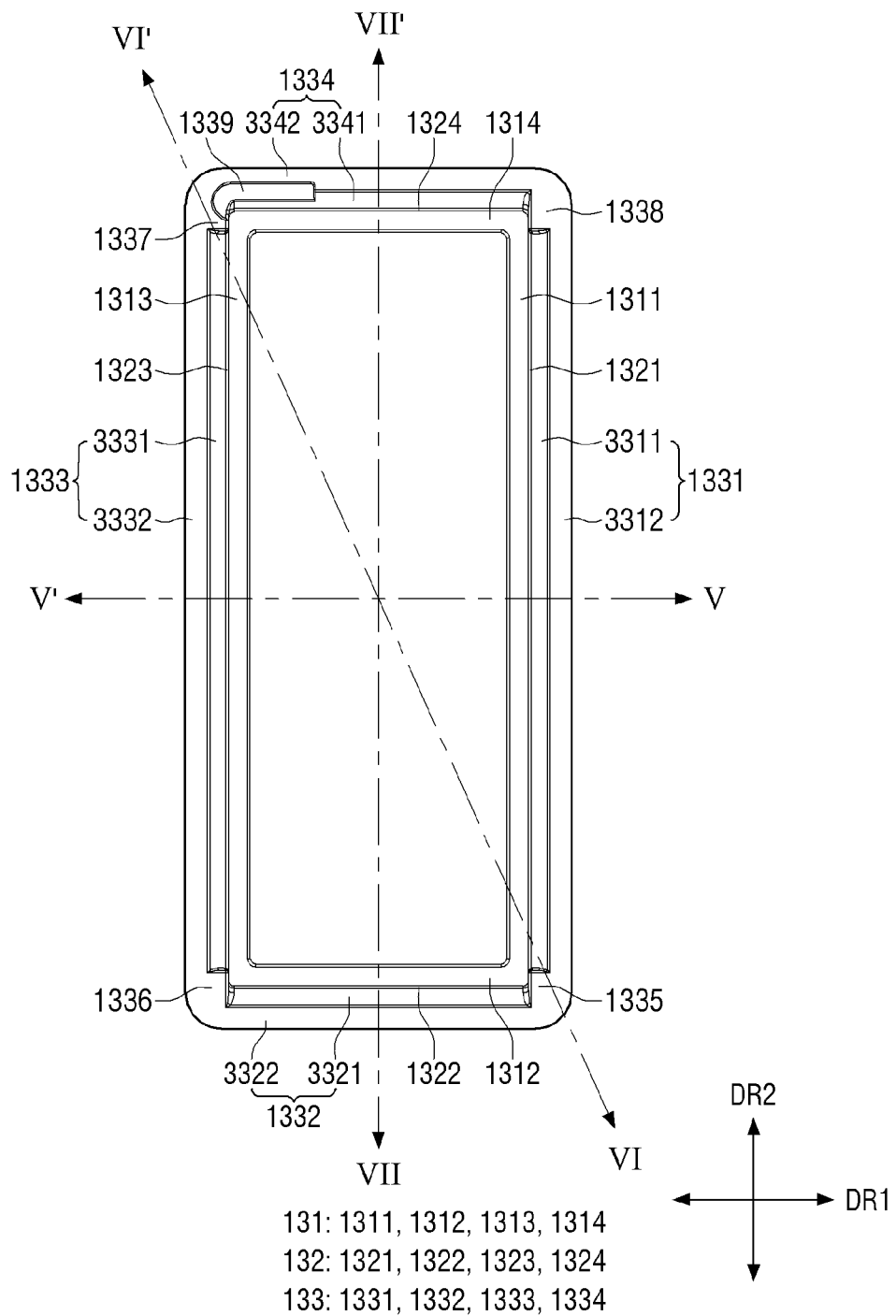
FIG. 25 is a bottom view showing an embodiment of the pressing pad of FIG. 20.
Figure 26:
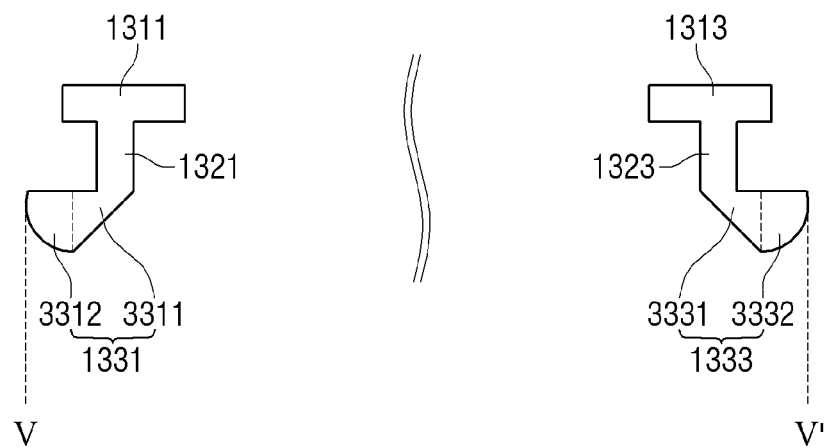
FIG. 26 is a cross-sectional view showing an embodiment of the pressing pad taken along line V-V' of FIGS. 24 and 25.
Figure 27:
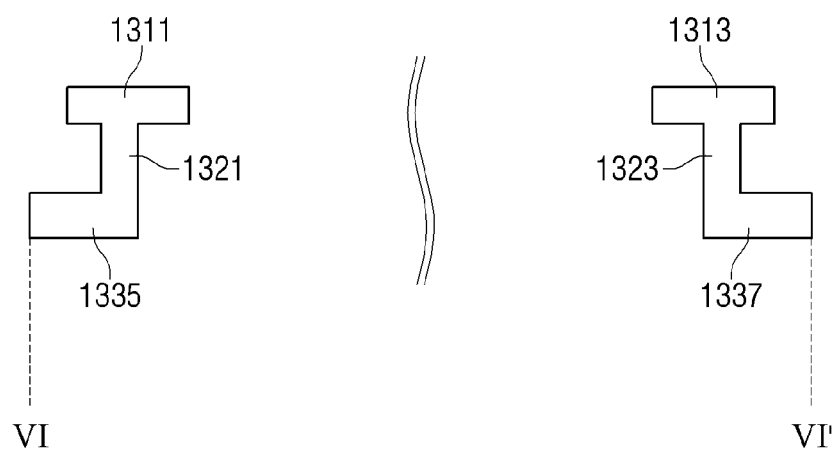
FIG. 27 is a cross-sectional view showing an embodiment of the pressing pad taken along line VI-VI' of FIGS. 24 and 25.

FIG. 24 is a top plan view showing an embodiment of the pressing pad 1130 of FIG. 20. FIG. 25 is a bottom plan view of the pressing pad 1130 of FIG. 20. FIG. 26 is a cross-sectional view showing an embodiment of the pressing pad 1130, taken along line V-V' of FIGS. 24 and 25. FIG. 27 is a cross-sectional view showing an embodiment of the pressing pad 1130 taken along line VI-VI' of FIGS. 24 and 25. FIG. 28 is a cross-sectional view showing an embodiment of the pressing pad 1130 taken along line VII-VII' of FIGS. 24 and 25.

In the example shown in FIGS. 24 and 25, the pressing pad 1130 has the shape of a frame shown in FIG. 21 in a plan view. FIG. 26 shows a cross-section of a first pressing portion 1331 and a third pressing portion 1333 of the pressing pad 1130. FIG. 27 shows an example of a cross-section of a first corner-pressing portion 1335 and a third corner-pressing portion 1337 of the pressing pad 1130. FIG. 28 shows an example of a cross-section of a second pressing portion 1332 and a fourth pressing portion 1334 of the pressing pad 1130.

Referring to FIGS. 24 to 28, the pressing pad 1130 may include a fixing portion 131, a pressing support portion 132, and a pressing portion 133. Although the fixing portion 131, the pressing support portion 132 and the pressing portion 133 are integral in the example shown in FIGS. 24 to 28, the invention is not limited thereto. The fixing portion 131, the pressing support portion 132 and the pressing portion 133 may be implemented as separate elements and may be connected to one another by using separate adhesive members.

In a cross-section, the fixing portion 131 may be disposed at the top of the pressing pad 1130. The pressing pad 1130 which faces the panel bottom cover 400 disposes the fixing portion 131 furthest from the panel bottom cover 400 among the fixing portion 131, the pressing support portion 132 and the pressing portion 133. The upper surface of the fixing portion 131 may define the upper surface of the pressing pad 1130. The fixing portion 131 may have a shape of a frame in a plan view. The fixing portion 131 may be insertable and fixable into an insertion hole IH formed by a body 1111 and a first protrusion portion 1112 of the first bracket 1110 as shown in FIG. 29.

The fixing portion 131 may include a first fixing portion 1311, a second fixing portion 1312, a third fixing portion 1313 and a fourth fixing portion 1314. The first fixing portion 1311 and the third fixing portion 1313 may each extend along the second direction DR2, and the second fixing portion 1312 and the fourth fixing portion 1314 may each extend along the first direction DR1. A first end of the first fixing portion 1311 may be connected to the second fixing portion 1312 at a second end thereof, and a second end of the first fixing portion 1311 may be connected to the fourth fixing portion 1314 at a first end thereof. A second end of the third fixing portion 1313 may be connected to the second fixing portion 1312 at a first end thereof, and a first end of the third fixing portion 1313 may be connected to the fourth fixing portion 1314 at a second end thereof.

The pressing support portion 132 may connect the fixing portion 131 with the pressing portion 133. The pressing support portion 132 may be connected to the fixing portion 131 at the lower surface thereof and to the pressing portion 133 at the upper surface thereof. The pressing support portion 132 may include a first pressing support portion 1321, a second pressing support portion 1322, a third pressing support portion 1323, and a fourth pressing support portion 1324.

The first pressing support portion 1321 may protrude from the lower surface of the first fixing portion 1311. The second pressing support portion 1322 may protrude from the lower surface of the second fixing portion 1312. The third pressing support portion 1323 may protrude from the lower surface of the third fixing portion 1313. The fourth pressing support portion 1324 may protrude from the lower surface of the fourth fixing portion 1314.

Portions of the fixing portion 131, the pressing support portion 132 and the pressing portion 133 may have a length (e.g., major dimension in the plan view) and a width (e.g., minor dimension in the plan view). Portions of the fixing portion 131, the pressing support portion 132 and the pressing portion 133 may have a thickness (e.g., cross-sectional dimension along the third direction DR3).

The width of the first pressing support portion 1321 may be smaller than the width of the first fixing portion 1311, and the width of the second pressing support portion 1322 may be smaller than the width of the second fixing portion 1312. The width of the third pressing support portion 1323 may be smaller than the width of the third fixing portion 1313, and the width of the fourth pressing support portion 1324 may be smaller than the width of the fourth fixing portion 1314.

The thickness of the first pressing support portion 1321 may be larger than the thickness of the first fixing portion 1311. The thickness of the second pressing support portion 1322 may be smaller than the thickness of the second fixing portion 1312. The thickness of the third pressing support portion 1323 may be smaller than the thickness of the third fixing portion 1313. The thickness of the fourth pressing support portion 1324 may be smaller than the thickness of the fourth fixing portion 1314.

The pressing portion 133 may be removably contacted with the panel bottom cover 400 to apply a pressing force to the panel bottom cover 400 by the pressing pad 1130. The pressing portion 133 may include the first pressing portion 1331, the second pressing portion 1332, the third pressing portion 1333 and the fourth pressing portion 1334.

The upper surface of the first pressing portion 1331 may be connected to the first pressing support portion 1321. The upper surface of the second pressing portion 1332 may be connected to the second pressing support portion 1322. The upper surface of the third pressing portion 1333 may be connected to the third pressing support portion 1323. The upper surface of the fourth pressing portion 1334 may be connected to the fourth pressing support portion 1324.

The width of the first pressing portion 1331 may be larger than the width of the first pressing support portion 1321. The width of the second pressing portion 1332 may be larger than the width of the second pressing support portion 1322. The width of the third pressing portion 1333 may be larger than the width of the third pressing support portion 1323. The width of the fourth pressing portion 1334 may be larger than the width of the fourth pressing support portion 1324.

An inner side may be furthest from an outer edge of the pressing pad 1130 in the plan view. An outer side may be closest to the outer edge of the pressing pad 1130. A respective side-pressing portion may define the outer edge of the pressing pad 1130. The curvature of a respective side-pressing portion may correspond to a curvature of a respective side surface of the display panel 300.

The first pressing portion 1331 may include a first inner part 3311 and a first side-pressing portion 3312. The first inner part 3311 may be disposed on the inner side of the first pressing portion 1331. The first side-pressing portion 3312 may be disposed on the outer side of the first pressing portion 1331. The thickness of the first inner part 3311 may increase in a direction from the inner side to the outer side of the first pressing portion 1331. The lower surface of the first inner part 3311 may be inclined or oblique. The thickness of the first side-pressing portion 3312 may decrease in a direction from the inner side to the outer side of the first pressing portion 1331. The lower surface of the first side-pressing portion 3312 may have a first curvature. The first curvature may be substantially equal to the curvature of the first side surface SS1 of the display panel 300.

The second pressing portion 1332 may include a second inner part 3321 and a second side-pressing portion 3322. The second inner part 3321 may be disposed on the inner side of the second pressing portion 1332. The second side-pressing portion 3322 may be disposed on the outer side of the second pressing portion 1332. The thickness of the second inner part 3321 may increase in a direction from the inner side to the outer side of the second pressing portion 1332. The lower surface of the second inner part 3321 may be inclined or oblique. The thickness of the second side-pressing portion 3322 may decrease in a direction from the inner side to the outer side of the second pressing portion 1332. The lower surface of the second side-pressing portion 3322 may have a second curvature. The second curvature may be substantially equal to the curvature of the second side surface SS2 of the display panel 300.

The third pressing portion 1333 may include a third inner part 3331 and a third side-pressing portion 3332. The third inner part 3331 may be disposed on the inner side of the third pressing portion 1333. The third side-pressing portion 3332 may be disposed on the outer side of the third pressing portion 1333. The thickness of the third inner part 3331 may increase in a direction from the inner side to the outer side of the third pressing portion 1333. The lower surface of the third inner part 3331 may be inclined or oblique. The thickness of the third side-pressing portion 3332 may decrease in a direction from the inner side to the outer side of the third pressing portion 1333. The lower surface of the third side-pressing portion 3332 may have a third curvature. The third curvature may be substantially equal to the curvature of the third side surface SS3 of the display panel 300.

The fourth pressing portion 1334 may include a fourth inner part 3341 and a fourth side-pressing portion 3342. The fourth inner part 3341 may be disposed on the inner side of the fourth pressing portion 1334. The fourth side-pressing portion 3342 may be disposed on the outer side of the fourth pressing portion 1334. The thickness of the fourth inner part 3341 may increase in a direction from the inner side to the outer side of the fourth pressing portion 1334. The lower surface of the fourth inner part 3341 may be inclined or oblique. The thickness of the fourth side-pressing portion 3342 may decrease in a direction from the inner side to the outer side of the fourth pressing portion 1334. The lower surface of the fourth side-pressing portion 3342 may have a fourth curvature. The fourth curvature may be substantially equal to the curvature of the fourth side surface SS4 of the display panel 300.

The first curvature, the second curvature, the third curvature and the fourth curvature may be substantially all equal. Alternatively, the first curvature, the second curvature, the third curvature and the fourth curvature may be different from one another. Alternatively, at least two of the first curvature, the second curvature, the third curvature and the fourth curvature may be substantially equal to each other. In an embodiment, for example, the first and the third curvatures may be different from the second and fourth curvatures, the first curvature may be equal to the third curvature, and the second curvature may be equal to the fourth curvature.

The pressing portion 133 may further include a first corner-pressing portion 1335, a second corner-pressing portion 1336, a third corner-pressing portion 1337 and a fourth corner-pressing portion 1338. A through-hole groove 1339 may be defined in the pressing portion 133. A respective corner-pressing portion may connect adjacent pressing portions to each other. A thickness of the pressing portion 133 at a respective corner-pressing portion thereof may be smaller than a thickness of respective pressing portions adjacent to the respective corner-pressing portion. In an embodiment, for example, the pressing portion 133 of the pressing pad 1130 may include a first pressing portion 1331 corresponding to the first side surface SS1 of the display panel 300 and including a lower surface which is closest to the panel mount 1500 and having a first curvature, a second pressing portion 1332 corresponding to the second side surface SS2 of the display panel 300 and including a lower surface which is closest to the panel mount 1500 and having a second curvature, and a first corner-pressing portion 1335 corresponding to the first corner portion (e.g., first corner CS1) of the display panel 300 and having a flat lower surface which is closest to the panel mount 1500.

The first corner-pressing portion 1335 may be disposed between the first pressing portion 1331 and the second pressing portion 1332. The lower surface of the first corner-pressing portion 1335 may have a quadrangular shape in a plan view. The lower surface of the first corner-pressing portion 1335 may be flat in order to press the panel bottom cover 400 at the first corner CS1 of the display panel 300. The thickness of the first corner-pressing portion 1335 may be smaller than the thickness of the first pressing portion 1331 and the thickness of the second pressing portion 1332.

The second corner-pressing portion 1336 may be disposed between the second pressing portion 1332 and the third pressing portion 1333. The lower surface of the second corner-pressing portion 1336 may have a quadrangular shape in a plan view. The lower surface of the second corner-pressing portion 1336 may be flat in order to press the panel bottom cover 400 at the second corner CS2 of the display panel 300. The thickness of the second corner-pressing portion 1336 may be smaller than the thickness of the second pressing portion 1332 and the thickness of the third pressing portion 1333.

The third corner-pressing portion 1337 may be disposed between the third pressing portion 1333 and the fourth pressing portion 1334. The lower surface of the third corner-pressing portion 1337 may have a quadrangular shape in a plan view. The lower surface of the third corner-pressing portion 1337 may be flat in order to press the panel bottom cover 400 at the third corner CS3 of the display panel 300. The thickness of the third corner-pressing portion 1337 may be smaller than the thickness of the third pressing portion 1333 and the thickness of the fourth pressing portion 1334.

The fourth corner-pressing portion 1338 may be disposed between the first pressing portion 1331 and the fourth pressing portion 1334. The lower surface of the fourth corner-pressing portion 1338 may have a quadrangular shape in a plan view. The lower surface of the fourth corner-pressing portion 1338 may be flat in order to press the panel bottom cover 400 at the fourth corner CS4 of the display panel 300. The thickness of the fourth corner-pressing portion 1338 may be smaller than the thickness of the first pressing portion 1331 and the thickness of the fourth pressing portion 1334.

The through-hole groove 1339 may be provided or formed in the pressing portion 133 at a position in line with at least one through-hole (e.g., among first through-hole TH1 and second through-hole TH2) of the display panel 300. The thickness of the pressing pad 1130 at the through-hole groove 1339 may be smaller than the thickness of the pressing pad 1130 at a solid portion thereof which is around and defines the through-hole groove 1339. The panel bottom cover 400 is omitted at the one through hole of the display panel 300. Accordingly, by virtue of the through-hole groove 1339, damage to the one through-hole when the display panel 300 is pressed by the pressing pad 1130 is reduced or effectively prevented As shown in FIGS. 24 to 28, the pressing pad 1130 includes the first pressing portion 1331 having the first curvature substantially equal to the curvature of the first side surface portion SS1 of the display panel 300, the second pressing portion 1332 having the second curvature substantially equal to the curvature of the second side surface SS2 of the display panel 300, the third pressing portion 1333 having the third curvature substantially equal to the curvature of the third side surface SS3, and the fourth pressing portion 1334 having the fourth curvature substantially equal to the curvature of the fourth side surface SS4 of the display panel 300. Accordingly, corresponding portions of the panel bottom cover 400 can be pressed to the display panel 300 by the pressing pad 1130 at the first to fourth side surfaces SS1, SS2, SS3 and SS4 of the display panel 300. Thus, failure of attachment of the panel bottom cover 400 at the first to fourth side surfaces SS1, SS2, SS3 and SS4 which may occur when the panel bottom cover 400 fails to be properly attached to the panel bottom cover 400 may be reduced or effectively prevented.

In addition, the lower surface of the first corner-pressing portion 1335, the lower surface of the second corner-pressing portion 1336, the lower surface of the third corner-pressing portion 1337 and the lower surface of the fourth corner-pressing portion 1338 of the pressing pad 1130 are provided or formed flat, taking into account the first corner CS1, the second corner CS2, the third corner CS3 and the fourth corner CS4 of the display panel 300. Accordingly, corresponding portions of the panel bottom cover 400 can be pressed the display panel 300 by the pressing pad 1130 at the first to fourth corners CS1, CS2, CS3 and CS4 of the display panel 300. Thus, failure of attachment of the panel bottom cover 400 at the first to fourth corners CS1, CS2, CS3 and CS4 which may occur when the panel bottom cover 400 fails to be properly attached to the panel bottom cover 400 may be reduced or effectively prevented.

Figure 29:
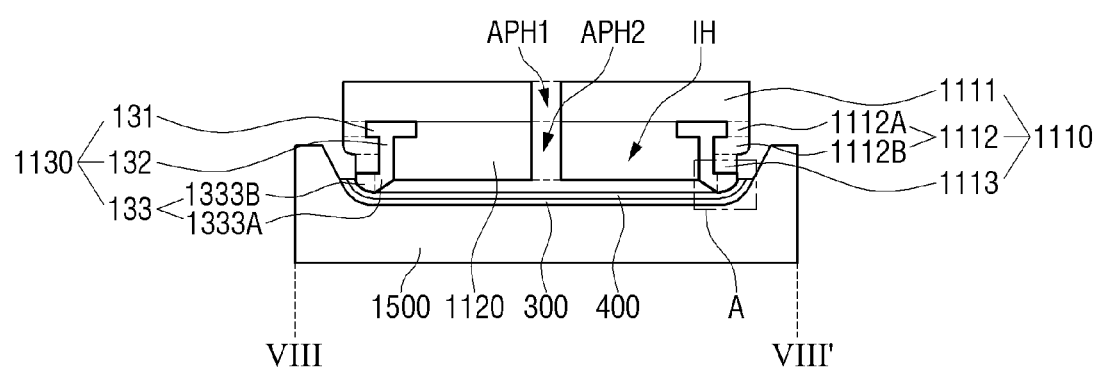
FIG. 29 is a cross-sectional view showing an embodiment of an apparatus for attaching a display panel taken along line VIII-VIII' of FIG. 19.
Figure 30:
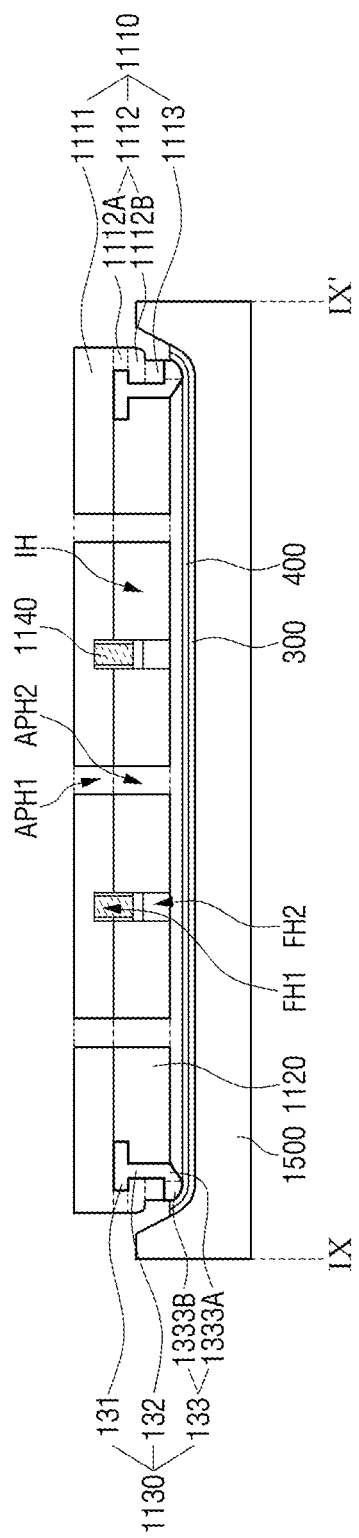
FIG. 30 is a cross-sectional view showing an embodiment of an apparatus for attaching a display panel taken along line IX-IX' of FIG. 19.
Figure 31:
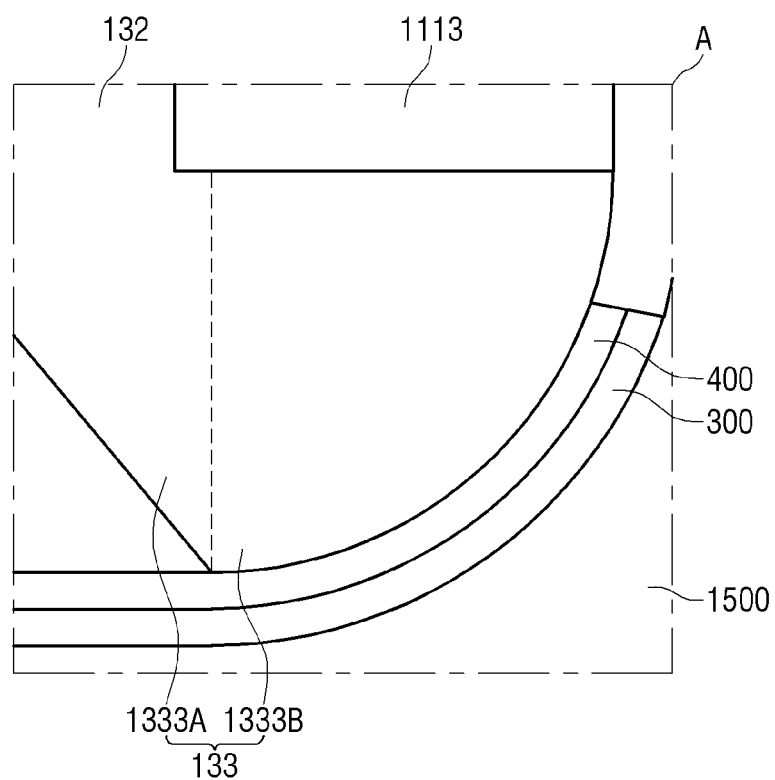
FIG. 31 is an enlarged cross-sectional view showing an embodiment of area A of FIG. 29.

FIG. 29 is a cross-sectional view showing an embodiment an apparatus 1000 for attaching a display panel 300 taken along line VIII-VIII' of FIG. 19. FIG. 30 is a cross-sectional view showing the apparatus 1000 for attaching a display panel 300 taken along line IX-IX' of FIG. 19. FIG. 31 is an enlarged, cross-sectional view showing an embodiment of area A of FIG. 29.

FIGS. 29 to 31 illustrate an example where the pressing module 1100 of the apparatus 1000 for attaching a display panel 300 moves down to press the panel bottom cover 400 toward the display panel 300.

Referring to FIGS. 29 to 31, the pressing module 1100 includes the first bracket 1110, the second bracket 1120 and the pressing pad 1130.

The first bracket 1110 may include a body 1111, a first protrusion portion 1112 and a second protrusion portion 1113.

The body 1111 may have, but is not limited to, a cuboid shape.

The first protrusion portion 1112 may protrude along the third direction DR3 from an outer edge of the body 1111. The first protrusion portion 1112 may form an insertion hole IH with which the fixing portion 131 of the pressing pad 1130 is engageable, like a hook. In an embodiment, for example, the insertion hole IH may have the cross-section in the shape of a 'C' by the body 1111 together with the first protrusion portion 1112. The insertion hole IH may be open to an inner side of the body 1111. The outer side of the fixing portion 131 of the pressing pad 1130 may be insertable into the insertion hole IH. In an embodiment, the pressing module 1100 further includes the first bracket 1110 and the second bracket 1120 which face each other with the pressing pad 1130 therebetween. The first bracket 1110 includes the body 1111 and a protrusion portion (e.g., first protrusion portion 1112 and second protrusion portion 1113) extending from opposing ends of the body 1111 and in a direction toward the panel mount 1500. The protrusion portion defines a recess open towards a center of the body 1111 and in which the fixing portion 131 of the pressing pad 1130 extends to be fixed to the pressing bracket at an inside thereof. The body 1111 and the protrusion portion define a space at the center of the body 1111, and the fixing portion 131 of the pressing pad 1130 extends out of the recess and into the space.

The first protrusion portion 1112 may include a first extension portion 1112A protruding from the edge of the surface of the body 1111 in the third direction DR3, and a second extension portion 1112B which protrudes from the first extension portion 1112A along the first direction DR1.

The second protrusion portion 1113 may protrude along the third direction DR3 from the second extension portion 1112B of the first protrusion portion 1112.

There may be a receiving opening (e.g. insertion hole IH) at the central area of the lower surface of the first bracket 1110 due to the body 1111 together with the first protrusion portion 1112 and the second protrusion portion 1113. That is to say, the first bracket 1110 may have a shape with the receiving opening open in a direction toward the display panel 300.

The second bracket 1120 may face the body 1111 and be disposed on the lower surface of the body 1111 of the first bracket 1110. The second bracket 1120 may be in contact with the body 1111 of the first bracket 1110. The second bracket 1120 may extend into the receiving opening to contact the body 1111.

A first outer side surface of the second bracket 1120 may be in contact with an inner surface of the fixing portion 131 and an inner surface of the pressing support portion 132 of the pressing pad 1130. Since the width of the fixing portion 131 of the pressing pad 1130 is larger than the width of the pressing support portion 132, the dimension of the upper surface of the second bracket 1120 along the first direction DR1 may be smaller than the dimension of the lower surface along the first direction DR1. The dimension of the upper surface of the second bracket 1120 along the second direction DR2 may be smaller than the dimension of the lower surface along the second direction DR2.

The fixing portion 131 of the pressing pad 1130 may be surrounded by the body 1111 together with the first protrusion portion 1112 of the first bracket 1110 and the second bracket 1120. The pressing support portion 132 of the pressing pad 1130 may be disposed between the second protrusion portion 1113 of the first bracket 1110 and an outer side surface of the second bracket 1120. Therefore, the pressing pad 1130 may be disposed between the first bracket 1110 and the second bracket 1120 so that the pressing pad 1130 is fixed within the first bracket 1110.

The pressing portion 133 of the pressing pad 1130 may be disposed on the lower surface of the second protrusion portion 1113 of the first bracket 1110. The pressing portion 133 of the pressing pad 1130 which is fixed in the first bracket 1110 may extend outside the first bracket 1110 to extend along the lower surface of the first bracket 1110 at the second protrusion portion 1113 thereof. The pressing portion 133 of the pressing pad 1130 may be in contact with the lower surface of the second protrusion portion 1113 of the first bracket 1110. In an embodiment, the pressing pad 1130 includes the fixing portion 131 fixed to the pressing bracket (e.g., first bracket 1110 in combination with second bracket 1120) at an inside of the pressing bracket, and a pressing portion 133 which extends from a distal end of the fixing portion 131 to outside the pressing bracket. A protrusion portion (e.g., the first protrusion portion 1112 and the second protrusion portion 1113 together) of the first bracket 1110 includes a lower surface which is furthest from the body 1111. The pressing portion 133 of the pressing pad 1130 which extends to outside the pressing bracket extends along the lower surface of the protrusion portion of the first bracket 1110 in a direction away from the center of the body 1111.

The pressing portion 133 of the pressing pad 1130 may include an inner part 1333A and a side-pressing portion 1333B. The inner part 1333A and the side-pressing portion 1333B may be one of the first inner part 3311 and the first side-pressing portion 3312 of the first pressing portion 1331, the second inner part 3321 and the second side-pressing portion 3322 of the second pressing portion 1332, the third inner part 3331 and the third side-pressing portion 3332 of the third pressing portion 1333, and the fourth inner part 3341 and the fourth side-pressing portion 3342 of the fourth pressing portion 1334. The inner part 1333A is connected to the pressing support portion 132, and the side-pressing portion 1333B serves to press corresponding portions of the panel bottom cover 400 toward the display panel 300.

A fixing member 1140 serves to fix the first bracket 1110 to the second bracket 1120. The second bracket 1120 may be fixed to the first bracket 1110 by the fixing member 1140. The first bracket 1110 may include a first fixing hole FH1 into which the fixing member 1140 extends, and the second bracket 1120 may include a second fixing hole FH2 into which the fixing member 1140 extends. The first fixing hole FH1 may be aligned with the second fixing hole FH2. In an embodiment, for example, the fixing member 1140 may be a screw, in which case, the fixing member 1140 may be fastened to the fixing hole FH1 which is threaded to engage with the screw.

The second fixing hole FH2 may be a hole penetrating through a thickness the second bracket 1120 to be open at an upper side and a lower side thereof. Since the fixing member 1140 is recessed into the second fixing hole FH2, the fixing member 1140 does not protrude outside the lower surface of the second bracket 1120 at the lower surface thereof. The dimension along the third direction DR3 of the fixing member 1140 may be smaller than the dimension along the third direction DR3 of the second fixing hole FH2.

The first bracket 1110 may include a first air passage hole APH1, and the second bracket 1120 may include a second air passage hole APH2. The first air passage hole APH1 and the second air passage hole APH2 may overlap each other or be aligned with each other along the third direction DR3.

When corresponding portions of the panel bottom cover 400 are pressed by the pressing module 1100, since the pressing pad 1130 has the shape of a frame in a plan view, air may be trapped at the central area of the pressing module 1100. When this happens, controlling the pressing force of the pressing module 1100 may be difficult. When the first air passage hole APH1 of the first bracket 1110 and the second air passage hole APH2 of the second bracket 1120 overlap each other, the air in the central area of the pressing module 1100 can exit through the first air passage hole APH1 and the second air passage hole APH2. Therefore, air that is trapped in the central area of the pressing module 1100 is exhausted to outside the pressing module 1100 and does not disturb the control of the pressing force applied by the pressing module 1100.

Referring to FIG. 31, the lower surface of the inner part 1333A may be defined by only an inclined surface, without being limited thereto. The inclined surface may meet a boundary between the inner part 1333A and the side-pressing portion 1333B. The lower surface of the side-pressing portion 1333B may be defined by only a curved surface, without being limited thereto.

Figure 32:
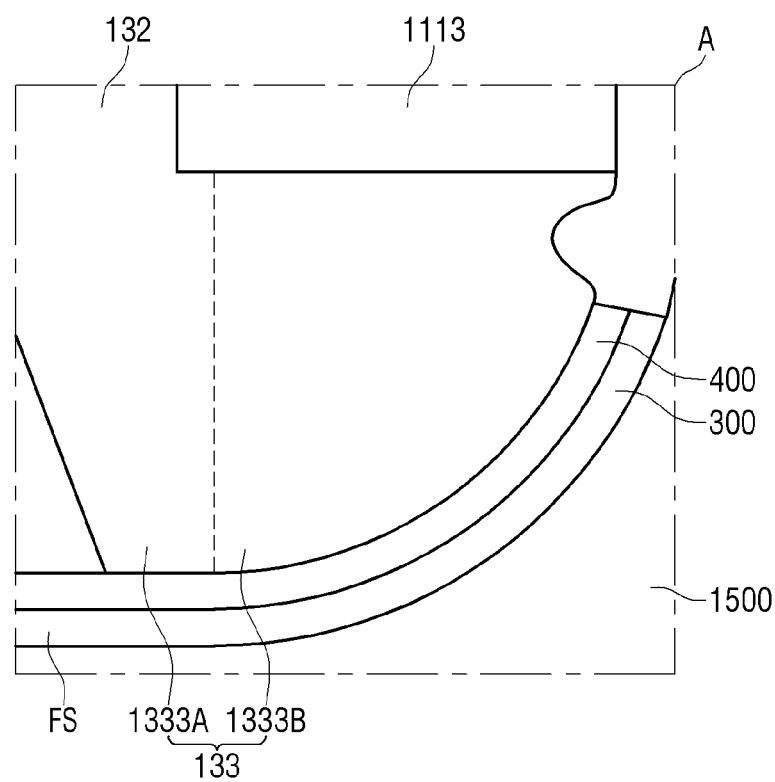
FIG. 32 is an enlarged cross-sectional view showing an embodiment of area A of FIG. 29.

FIG. 32 is an enlarged cross-sectional view showing an embodiment of area A of FIG. 29.

The embodiment of FIG. 32 is different from the embodiment of FIG. 30 in that the inner part 1333A of FIG. 32 is provided or formed to press the edge of the front surface FS of the display panel 300 together with a curved portion thereof, and that a portion of the lower surface of the side-pressing portion 1333B has a concave cross-section. That is, the lower surface of the inner part 1333A may be defined by both an inclined surface and a flat surface. The flat surface of the inner part 1333A may extend from the boundary between the inner part 1333A and the side-pressing portion 1333B to meet the inclined surface of the inner part 1333A. The lower surface of the side-pressing portion 1333B may include both a curved surface and a concave recess which is extended from the curved surface. The side-pressing portion 1333B may extend further than outer edges of the panel bottom cover 400 and the display panel 300 to define an extended portion of the side-pressing portion 1333B which does not contact the panel bottom cover 400. The extended portion of the side-pressing portion 1333B may define the concave recess.

Referring to FIG. 32, since the inner part 1333A can press the edge of the front surface FS of the display panel 300, improper attachment of the panel bottom cover 400 to the display panel 300 at the edge of the front surface FS may be reduced or effectively prevented. In addition, a portion of the lower surface of the side-pressing portion 1333B that is not in contact with the panel bottom cover 400 may have a concave cross-section. A portion of the lower surface of the side-pressing portion 1333B not in contact with the panel bottom cover 400 (e.g., extended portion) may be disposed adjacent to the upper surface of the side-pressing portion 1333B.

Figure 33:
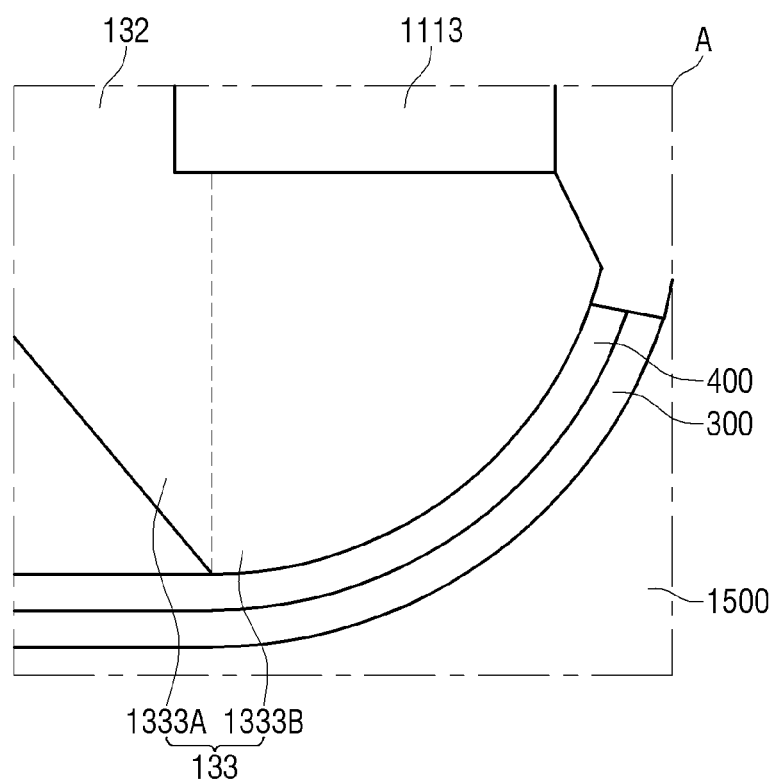
FIG. 33 is an enlarged cross-sectional view showing an embodiment of area A of FIG. 29.

FIG. 33 is an enlarged cross-sectional view showing an embodiment of area A of FIG. 29.

The embodiment of FIG. 33 is different from the embodiment of FIG. 30 in that a portion of the lower surface of a side-pressing portion 1333B in contact with a panel bottom cover 400 has a curvature whereas an extended portion of the lower surface of the side-pressing portion 1333B which is not in contact with the panel bottom cover 400 does not having a curvature and is inclined or oblique relative to the curvature.

Figure 34:
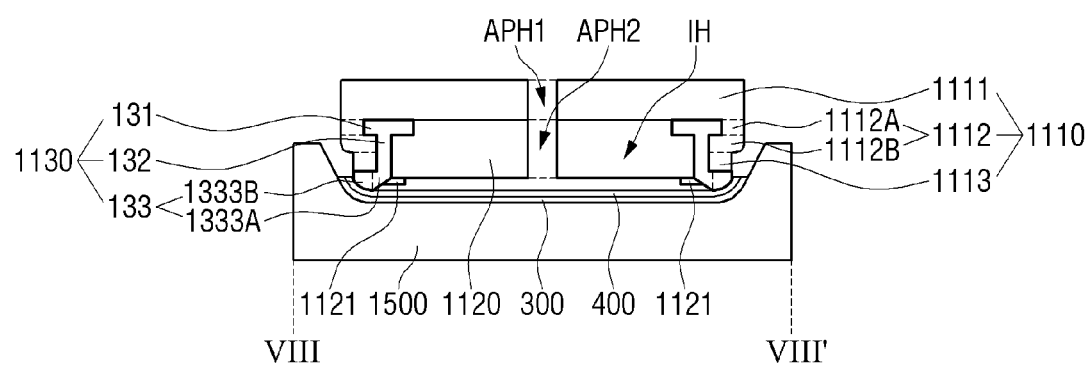
FIG. 34 is a cross-sectional view showing an embodiment of an apparatus for attaching a display panel taken along line VIII-VIII' of FIG. 19.
Figure 35:
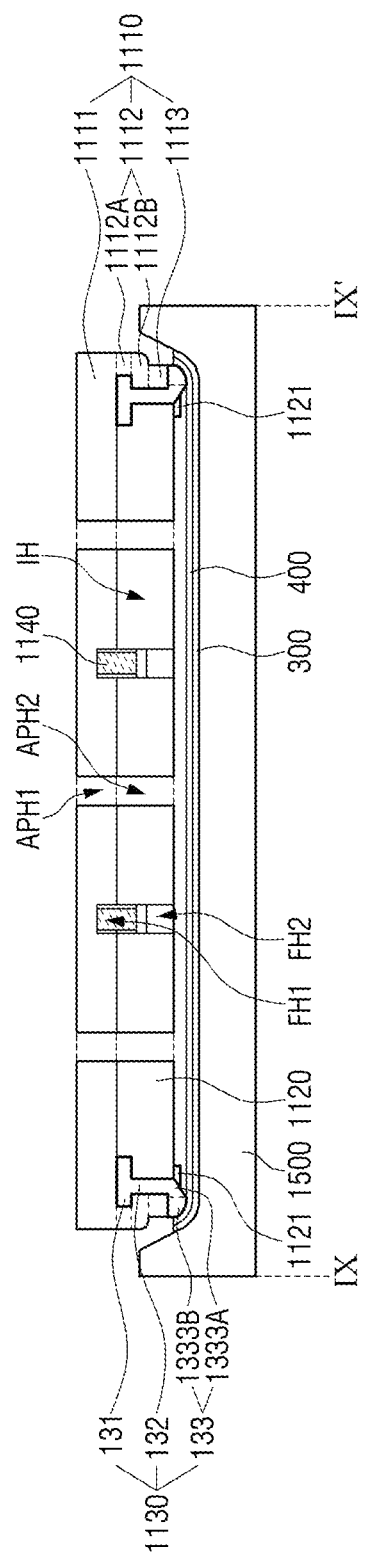
FIG. 35 is a cross-sectional view showing an embodiment of an apparatus for attaching a display panel taken along line IX-IX' of FIG. 19.

FIG. 34 is a cross-sectional view showing an embodiment of an apparatus 1000 for attaching a display panel 300 taken along line VIII-VIII' of FIG. 19. FIG. 35 is a cross-sectional view showing the apparatus 1000 for attaching a display panel 300 taken along line IX-IX' of FIG. 19.

The embodiment of FIGS. 34 and 35 is different from the embodiment of FIGS. 29 and 30 in that a second bracket 1120 includes a supporter 1121 that protrudes from the lower surface of the second bracket 1120 and supports the lower surface of a pressing portion 133 in order to suppress deformation when the pressing portion 133 presses a panel bottom cover 400. The supporter 1121 is brought into contact with the lower surface of the inner part 1333A of the pressing portion 133 to support the lower surface of the inner part 1333A. In an embodiment, the pressing portion 133 of the pressing pad 1130 which extends to outside the pressing bracket includes a lower surface which is outside the pressing bracket and furthest from the body 1111, and the second bracket 1120 includes a supporter 1121 which extends along the lower surface of the pressing portion 133. The elements of FIGS. 34 and 35 identical to those of FIGS. 29 and 30 will not be described to avoid redundancy.

In such embodiments of an apparatus 1000 for attaching a display panel 300 includes a pressing pad 1130 that covers first to fourth side surfaces SS1, SS2, SS3 and SS4 and first to fourth corners CS1, CS2, CS3 and CS4 of the display panel 300. As the pressing module 1100 moves up and down, corresponding portions of a panel bottom cover 400 can be pressed to the display panel 300 at the first to fourth side surfaces SS1, SS2, SS3 and SS4 and the first to fourth corners CS1, CS2, CS3 and CS4 of the display panel 300 using a pressing pad 1130 of the pressing module 1100. In this manner, attachment failure of the panel bottom cover 400 to the display panel 300 at the first to fourth corners CS1, CS2, CS3 and CS4 and the first to fourth side surfaces SS1, SS2, SS3 and SS4 of the display panel 300 may be reduced or effectively prevented.

The invention should not be construed as being limited to the embodiments set forth herein. Rather, these embodiments are provided so that this invention will be thorough and complete and will fully convey the invention to those skilled in the art.

While the invention has been particularly shown and described with reference to embodiments thereof, it will be understood by those of ordinary skill in the art that various changes in form and details may be made therein without departing from the spirit or scope of the invention.

What is claimed is:

1. An apparatus for attaching a display panel, comprising:
a panel mount which receives the display panel including
a plurality of surfaces, the surfaces comprising:
a front surface including first to fourth sides,
a first side surface extending from the first side of the front surface in a first direction,
a second side surface extending from the second side of the front surface in a second direction which crosses the first direction,
a third side surface extending from the third side of the front surface in the first direction,
a fourth side surface extending from the fourth side of the front surface in the second direction,
a first corner portion between the first side surface and the second side surface, a second corner portion between the second side surface and the third side surface,
a third corner portion between the third side surface and the fourth side surface, and
a fourth corner portion between the first side surface and the fourth side surface; and
a pressing module which provides a pressing force to a panel bottom cover which faces the plurality of surfaces of the display panel, the pressing module comprising:
a pressing pad which applies the pressing force to the panel bottom cover at the first to fourth corner portions of the display panel, to attach the panel bottom cover to the display panel at the first to fourth corner portions thereof, and
the pressing pad comprising:
a first pressing portion corresponding to the first side surface of the display panel;
a second pressing portion corresponding to the second side surface of the display panel;
a third pressing portion corresponding to the third side surface of the display panel;
a fourth pressing portion corresponding to the fourth side surface of the display panel;
a first corner-pressing portion corresponding to the first corner portion of the display panel, and disposed between the first pressing portion and the second pressing portion;
a second corner-pressing portion corresponding to the second corner portion of the display panel, and disposed between the second pressing portion and the third pressing portion;
a third corner-pressing portion corresponding to the third corner portion of the display panel, and disposed between the third pressing portion and the fourth pressing portion; and
a fourth corner-pressing portion corresponding to the fourth corner portion of the display panel, and disposed between the fourth pressing portion and the first pressing portion.

2. The apparatus of claim 1, wherein the pressing module further comprises:
a pressing bracket to which the pressing pad is fixed,
each of the pressing pad and the pressing bracket having a hardness, and
the hardness of the pressing pad lower than the hardness of the pressing bracket.

3. The apparatus of claim 2, wherein
the pressing pad comprises silicon, and
the pressing bracket comprises a metal.

4. The apparatus of claim 1, wherein the pressing pad has a quadrangular frame shape.

5. An apparatus for attaching a display panel, comprising
a panel mount which receives the display panel including
a plurality of corner portions; and
a pressing module which provides a pressing force to a panel bottom cover which faces the plurality of corner portions of the display panel,
wherein
the pressing module comprises a pressing pad which applies the pressing force to the panel bottom cover at the corner portions of the display panel to attach the panel bottom cover to the display panel at the corner portions thereof, and
the pressing pad comprises:

a first pressing pad and a second pressing pad extending along a first direction and facing each other along a second direction which intersects the first direction; and a third pressing pad and a fourth pressing pad extending along the second direction and facing each other along the first direction, wherein the first pressing pad, the second pressing pad, the third pressing pad and the fourth pressing pad are disconnected from one another at corner portions of the pressing pad which correspond to the corner portions of the display panel.

6. The apparatus of claim 5, wherein each of the first pressing pad, the second pressing pad, the third pressing pad and the fourth pressing pad has a first end and a second end which is opposite to the first end, at a first corner portion of the pressing pad, the first end of the third pressing pad is adjacent to the first end of the first pressing pad, at a second corner portion of the pressing pad, the second end of the third pressing pad is adjacent to the first end of the second pressing pad, at a third corner portion of the pressing pad, the first end of the fourth pressing pad is adjacent to the second end of the first pressing pad, and at a fourth corner portion of the pressing pad, the second end of the fourth pressing pad is adjacent to the second end of the second pressing pad.

7. The apparatus of claim 6, wherein each of the first end and the second end of the first pressing pad, the first end and the second end of the second pressing pad, the first end and the second end of the third pressing pad, and the first end and the second end of the fourth pressing pad has a triangular shape in a plan view.

8. The apparatus of claim 6, wherein the pressing pad further comprises:

at the first corner portion of the pressing pad, a first corner pressing pad adjacent to the first end of the first pressing pad and the first end of the third pressing pad;

at the second corner portion of the pressing pad, a second corner pressing pad adjacent to the first end of the second pressing pad and the second end of the third pressing pad;

at the third corner portion of the pressing pad, a third corner pressing pad adjacent to the second end of the first pressing pad and the first end of the fourth pressing pad; and at the fourth corner portion of the pressing pad, a fourth corner pressing pad adjacent to the second end of the second pressing pad and the second end of the fourth pressing pad.

9. The apparatus of claim 8, wherein each of the first corner-pressing pad, the second corner-pressing pad, the third corner-pressing pad and the fourth corner-pressing pad has a triangular shape in a plan view.

10. The apparatus of claim 2, wherein the pressing module further comprises:

the pressing bracket including a first bracket and a second bracket which face each other with the pressing pad therebetween, a first air passage hole penetrating the first bracket, a second air passage hole penetrating the second bracket, and the first air passage hole of the first bracket aligned with the second air passage hole of the second bracket.

11. The apparatus of claim 2, wherein the pressing module further comprises:

the pressing bracket including a first bracket and a second bracket which face each other with the pressing pad therebetween, and a fixing member which fixes the first bracket to the second bracket.

12. The apparatus of claim 11, wherein the first bracket defines a first fixing hole through which the fixing member is fixed to the first bracket, and the second bracket defines a second fixing hole which penetrates the second bracket and through which the fixing member extends to be fixed to the first bracket at the first fixing hole thereof.

13. The apparatus of claim 1, wherein the pressing module further comprises a pressing bracket to which the pressing pad is fixed, and the pressing pad further comprises a fixing portion fixed to the pressing bracket at an inside of the pressing bracket, wherein the pressing portion extends from a distal end of the fixing portion to outside the pressing bracket and applies the pressing force to the panel bottom cover.

14. The apparatus of claim 13, wherein the pressing bracket comprises a first bracket and a second bracket which face each other with the pressing pad therebetween, and the first bracket comprises:

a body; and a protrusion portion extending from opposing ends of the body and in a direction toward the panel mount.

15. The apparatus of claim 14, wherein the protrusion portion defines a recess open towards a center of the body and in which the fixing portion of the pressing pad extends to be fixed to the pressing bracket at the inside thereof.

16. The apparatus of claim 15, wherein the body and the protrusion portion define a space at the center of the body, and the fixing portion of the pressing pad extends out of the recess and into the space.

17. The apparatus of claim 15, wherein the second bracket comprises a side surface facing the protrusion portion of the first bracket, and the fixing portion of the pressing pad is between the protrusion portion of the first bracket and the side surface of the second bracket.

18. The apparatus of claim 17, wherein the protrusion portion of the first bracket includes a lower surface which is furthest from the body, and the pressing portion of the pressing pad which extends to outside the pressing bracket extends along the lower surface of the protrusion portion of the first bracket in a direction away from the center of the body.

19. The apparatus of claim 14, wherein the pressing portion of the pressing pad which extends to outside the pressing bracket includes a lower surface which is outside the pressing bracket and furthest from the body, and the second bracket comprises a supporter which extends along the lower surface of the pressing portion.

20. The apparatus of claim 1, wherein the pressing module and the pressing pad are movable together in a direction toward the panel mount, and movement of the pressing module to the panel mount includes:

contacting the pressing pad to the panel bottom cover at the corner portions of the display panel, and applying the pressing force to the panel bottom cover to attach the panel bottom cover to the display panel at the corner portions thereof.

\* \* \* \* \*